United States Patent
Murray et al.

(10) Patent No.: US 6,781,134 B1
(45) Date of Patent: Aug. 24, 2004

(54) HANDHELD CZT RADIATION DETECTOR

(75) Inventors: William S. Murray, Santa Fe, NM (US); Kenneth B. Butterfield, Los Alamos, NM (US); William Baird, Abiquiu, NM (US)

(73) Assignee: The Regents of the University of California, Oakland, CA (US)

( * ) Notice: Subject to any disclaimer, the term of this patent is extended or adjusted under 35 U.S.C. 154(b) by 242 days.

(21) Appl. No.: 09/930,434

(22) Filed: Aug. 14, 2001

(51) Int. Cl.⁷ .............................................. G01T 1/02
(52) U.S. Cl. ........................ 250/370.13; 250/370.12
(58) Field of Search ...................... 250/370.13, 370.12, 250/338.4, 338.1, 370.01, 336.1

(56) References Cited

U.S. PATENT DOCUMENTS

| | | | | |
|---|---|---|---|---|
| 4,362,935 A | * | 12/1982 | Clark, III | 378/48 |
| 4,550,381 A | * | 10/1985 | Waechter et al. | 250/369 |
| 5,347,129 A | * | 9/1994 | Miller et al. | 250/336.1 |
| 5,528,495 A | | 6/1996 | Roscoe | 364/422 |
| 5,530,249 A | | 6/1996 | Luke | 250/374 |
| 5,572,027 A | * | 11/1996 | Tawil et al. | 250/336.1 |
| 5,602,886 A | | 2/1997 | Gross et al. | 376/253 |
| 5,757,227 A | * | 5/1998 | McQuaid et al. | 327/561 |
| 5,821,541 A | | 10/1998 | Tumer | 250/370.09 |
| 5,933,706 A | | 8/1999 | James et al. | 438/93 |
| 6,043,106 A | | 3/2000 | Mescher et al. | 438/93 |
| 6,094,471 A | | 7/2000 | Silver et al. | 378/84 |
| 6,111,929 A | | 8/2000 | Hazlett | 378/45 |
| 6,122,042 A | | 9/2000 | Wunderman et al. | 356/73 |
| 6,168,967 B1 | | 1/2001 | Hoffbauer et al. | 438/95 |
| 6,207,957 B1 | | 3/2001 | Kammeraad et al. | 250/370.1 |
| 6,272,373 B1 | * | 8/2001 | Bouton | 600/436 |

OTHER PUBLICATIONS

"Neutron Detection and Counting", web pages, canberra.com, Apr. 12, 2001, 5 pages.
"X–Ray and Gamma Ray Detector High Resolution CZT Cadmium Zinc Telluride", web pages. amptek.com, Apr. 11, 2001, 8 pages.
"Charge Trapping in XR–100T–CZT Detectors Application Note", web pages, amptek.com, Apr. 18, 2001, 15 pages.
McConnell, M., et al., "Three–Dimensional Imaging Performance of Othogonal Coplanner CZT Strip Detectors," 45th SPIE Meeting, Jul. 30–Aug. 4, 2000.

* cited by examiner

Primary Examiner—David Porta
Assistant Examiner—Christine Sung
(74) Attorney, Agent, or Firm—Madson & Metcalf

(57) ABSTRACT

A handheld CZT radiation detector having a CZT gamma-ray sensor, a multichannel analyzer, a fuzzy-logic component, and a display component is disclosed. The CZT gamma-ray sensor may be a coplanar grid CZT gamma-ray sensor, which provides high-quality gamma-ray analysis at a wide range of operating temperatures. The multichannel analyzer categorizes pulses produce by the CZT gamma-ray sensor into channels (discrete energy levels), resulting in pulse height data. The fuzzy-logic component analyzes the pulse height data and produces a ranked listing of radioisotopes. The fuzzy-logic component is flexible and well-suited to in-field analysis of radioisotopes. The display component may be a personal data assistant, which provides a user-friendly method of interacting with the detector. In addition, the radiation detector may be equipped with a neutron sensor to provide an enhanced mechanism of sensing radioactive materials.

45 Claims, 13 Drawing Sheets

| | Peak #1 1502 | Peak #2 1502 | Peak #3 1502 | Peak #4 1502 | Peak#5 1502 | Sum | Ranking Weighting Value 1510 |
|---|---|---|---|---|---|---|---|
| Energy Level of Peaks from Pulse Height Data 1504 | 79.5 KeV | 274.7 KeV | 304 KeV | 356 KeV | 572.5 KeV | | |
| Peak Analysis Weighting Values 1108 | 1.0 | 0.88 | 1.0 | 1.0 | 0.19 | 4.06 | |
| Energy Level of Peaks from NP-237, a Radioisotope from the Listing of Radioisotopes 1132 | 86.5 | | 312.2* | | | | |
| Matching Weighting Values 1130 | 0.55 | | 0.57 | | | | 2.94 |
| Energy Level of Peaks from Ba-133, a Radioisotope from the Listing of Radioisotopes 1132 | 81 | 276.4 | 302 | 356* | | | |
| Matching Weighting Values 1130 | 1.0 | 0.88 | 1.0 | 1.0 | | 3.88 | 0.18 |
| Energy Level of Peaks from Xe-133, a Radioisotope from the Listing of Radioisotopes 1132 | 81* | | | | | | |
| Matching Weighting Values 1130 | 1.0 | | | | | 1.0 | 3.06 |

*Denotes a "must have" peak

Fig. 15

HANDHELD CZT RADIATION DETECTOR

GOVERNMENTAL RIGHTS

This invention was made under Government Contract Number W-7405-ENG-36 awarded by the United States Department of Energy to The Regents of the University of California. The Government has certain rights in the invention.

BACKGROUND OF THE INVENTION

1. The Field of the Invention

The present invention relates to a portable device for detecting radiation and, more particularly, to a handheld CZT radiation detector.

2. The Relevant Technology

Radioactive materials are unstable and emit radiation in the form of alpha, beta, gamma, or X-rays. Many different types of radiation detectors have been designed and manufactured to produce data corresponding to radioactive materials.

One type of radiation detector is a pulse mode detector, in which a separate electrical pulse is generated for each individual radiation quantum (e.g., a gamma ray) that interacts with a detector. A high-purity germanium detector, which is often cooled by liquid nitrogen, is one example of a pulse-mode detector. By way of example, a gamma ray interacts with a detector surface coupled to a cathode and an anode. A portion of the energy of the gamma ray may be deposited on the detector to produce a charge. From the point of interaction, freed electrons drift towards the anode and ions (or holes) drift towards the cathode. A signal relating to the produced charge is often captured and manipulated by charge-sensitive preamplifiers and shaping amplifiers, resulting in a voltage pulse. Before entering a shaping amplifier, the pulse may have a long tail because the energy produced by the gamma-ray interaction decreases gradually. The shaping amplifier cuts off that tail, enabling detection of more pulses within a fixed period of time. The peak amplitude of such a voltage pulse is proportional to the energy deposited on a detector by a gamma ray.

Analog-to-digital converters (ADCs) are frequently employed to generate a digital number indicating the height, or the amplitude, of each voltage pulse. Such digital pulse data may be gathered and analyzed to learn more about the corresponding radioactive material. For example, the digitized pulse data may be categorized into channels, each channel indicating a specific energy level range into which the amplitude of the pulse falls. Energy levels are often measured in kiloelectron volts (KeVs). Devices that analyze multiple channels of pulse data are called multi-channel analyzers. Pulse data is often displayed on a chart showing the number of pulses (or counts) that the detector receives at a specific energy level range.

These charts frequently show a series of consecutive energy level ranges and a number of counts received in each range. This data so configured is frequently referred to as pulse height data or a pulse height distribution. By analyzing pulse height data, experts in the field may make determinations regarding the corresponding radioactive material. Such determinations may be made by automated analysis algorithms, a visual inspection, or a combination of the two.

Pulse height data is particularly useful in determining the composition of a corresponding radioactive material. Different radioisotopes emit radiation at varying energy levels. For example, plutonium-239 emits gamma radiation of approximately 203, 330, 375, 414, and 451 KeVs, among other energy levels. By examining the energy levels and intensity of such peaks within the pulse height data, the source of the radiation may be identified.

One application of this technology relates to radioisotope detection and identification to prevent illegal transportation of nuclear materials. The U.S. Customs Service, the Federal Bureau of Investigation, the U.S. Secret Service, and the International Atomic Energy Agency (IAEA) share this common interest. The United States is particularly concerned about shipments of fissionable nuclear materials such as uranium or plutonium. Likewise, environmentalists and consumer health advocates are similarly concerned about detecting and identifying radioactive materials.

A radioisotope detector's resolution affects its ability to accurately detect and identify radioisotopes. Ideally, pulses generated by a detector fall within discrete channels, creating tall and narrow peaks. However, because of poor resolution, peaks are frequently spread over a number of channels. Poor resolution can be the result of a number of factors, including noise produced by pulse-processing electronics and variation in a detector's parameters. If the resolution of a detector is poor, it may be impossible to identify discrete peaks characteristic of a particular radioactive material because the peaks will simply blend together and be indistinguishable, thus making it difficult or impossible to accurately identify a corresponding radioisotope.

The resolution of a detector is often measured employing a full-width-at-half-maximum (FWHM) terminology. FWHM may be expressed as a ratio of the width of the peak at half of the peak's maximum value over the peak's maximum value. This ratio is frequently given as a percentage, and small values correspond to narrow peaks and good energy resolution.

Conventionally, thallium (NaI(Tl)) scintillators and high-purity germanium detectors have been used for in-field radioisotope analysis. Scintillators, however, suffer from poor resolution, resulting in a low-confidence level in data produce thereby. The resolution of a scintillator is typically about only 7% FWHM at 662 KeV.

While high-purity germanium detectors provide excellent resolution, they suffer from a number of serious disadvantages. These detectors require in-field calibration to ensure the accuracy of the readings taken. To calibrate these devices, of course, requires transportation of a radioactive material from which to gauge the detector. This is extremely cumbersome, dangerous, and frequently requires governmental licensing. Furthermore, high-purity germanium detectors must be cooled to liquid-nitrogen temperatures and are extremely fragile. Extensive training is required to correctly operate this type of detector.

Another concern with conventional portable radiation detectors deals with automated analysis to determine the composition of a corresponding radioactive material. Conventional techniques, such as the Chi-square analysis, are inflexible and do not consider the variables present with in field analysis. In-field analysis often involves unknown distances between the detector and radioactive material, an unknown form of the radioactive material (gas, solid, or liquid), and unknown barriers between the radioactive material and detector. Conventional techniques are rigid and, as such, may provide unsatisfactory results given these variables. Moreover, the conventional techniques are computationally intensive, particularly for the limited resources of portable devices. Thus, employing such techniques may draw substantial resources (e.g., battery power) from the portable detector and may not produce timely or accurate results.

Consequently, it would be an advancement in the art to provide a portable radiation detector having automated radioisotope identification capabilities sufficiently flexible to adapt to the variables of in-field analysis. It would be a further advancement in the art to provide a portable radiation detector which operates at room temperatures, does not require in-field calibration, is not fragile, does not require training to use, and yet provides higher resolution.

BRIEF SUMMARY OF THE INVENTION

A handheld cadmium zinc telluride (CZT) radiation detector provides a portable radiation detector implementing a fuzzy-logic radioisotope identification procedure adapted to in-field analysis. This fuzzy-logic procedure is computationally less intensive and more flexible than conventional identification algorithms used in portable radiation detectors, thus providing timely and more accurate results to an end-user and extending the detector's battery life. Furthermore, in one embodiment, the handheld CZT radiation detector implements a coplanar grid CZT gamma ray sensor which provides higher resolution than conventional scintillators, but does not require in-field calibration or cooling to liquid-nitrogen temperatures like high-purity germanium detectors. To be more specific, the handheld CZT radiation detector provides about twice the resolution of a conventional scintillator and may be operated by untrained individuals, unlike a high-purity germanium detector. In addition, as the name implies, the handheld CZT radiation detector is sized to be held in a person's hand, just as a personal data assistant (e.g., a PalmPilot® by Palm, Inc.). Thus, the handheld CZT radiation detector is substantially smaller than conventional portable radiation detectors. In addition, the handheld CZT radiation detector is user-friendly because, in one embodiment, a user may interact with the detector through a personal data assistant.

The handheld CZT radiation detector may comprise a sensor for sensing gamma rays employing cadmium zinc telluride (CZT). The sensor may be coupled to a processor for processing commands stored in memory.

The sensor may be a CZT gamma-ray sensor. A CZT gamma-ray sensor may include any gamma-ray sensor using a CZT crystal. A CZT gamma-ray sensor may further comprise circuitry for converting charge produced by a gamma ray interacting with the CZT crystal into a shaped voltage pulse, which may be referred to as gamma-ray data. The amplitude of the shaped voltage pulse is proportional to the energy deposited on the CZT crystal by a gamma ray. CZT gamma-ray sensors are known, and those skilled in the art will understand that such sensors may be configured in numerous ways and still fall within the scope of this invention.

CZT gamma-ray sensors include, in one embodiment, a coplanar grid CZT gamma-ray sensor. The coplanar grid CZT gamma-ray sensor collects two separate anode signals from the CZT crystal. One signal indicates energy produced by charge motion in the CZT crystal and the other indicates the energy produced by both the charge motion and an interaction with a gamma ray. By subtracting the two signals using a differencing amplifier, the charge motion may be removed from the signal, producing excellent resolution. A shaping amplifier then modifies the pulse. Coplanar grid CZT gamma-ray sensors are known, and those skilled in the art are familiar with the numerous ways in which such sensors may be configured and still fall within the scope of this invention.

Use of a coplanar grid CZT gamma-ray sensor in a portable device results in a number of advantages over conventional portable radiation detectors. Coplanar grid CZT gamma-ray sensors operate correctly in a wide range of temperatures (e.g., about −10° to about +50° Celsius), unlike conventional high-purity germanium detectors, which operate correctly only at liquid-nitrogen temperatures. In addition, a coplanar grid CZT gamma-ray sensor provides far superior resolution to conventional scintillators.

The handheld CZT radiation detector may further comprise a multichannel analyzer (MCA) for performing multi-channel analysis. In one embodiment, the MCA is coupled to the sensor and processor. An MCA is configured to produce pulse height data corresponding to the gamma-ray data. Stated more precisely, the MCA receives a shaped voltage pulse (gamma-ray data) and converts the voltage pulse into a digital number indicating the height of the pulse. The MCA then categorizes the pulse into an energy level range (a channel). The MCA keeps track of the number of pulses (or counts) received in a given channel, producing count patterns, or pulse height data. Thus, the MCA is configured to produce pulse height data corresponding to the gamma-ray data.

The handheld CZT radiation detector may further comprise an analysis component for compiling a ranked listing of radioisotopes corresponding to the pulse height data. The radioisotopes are ranked by how closely they fit the pulse height data. The analyzer may be coupled to the MCA and processor.

In one embodiment, the analysis component may comprise a fuzzy-logic component. Counting statistics and measurement geometries can mask or hide usually prominent features in pulse height data. Crisp logic methods define criteria that categorize an event as either belonging to a set or not. Fuzzy logic does not involve such discrete categorizations, but involves an assigned weighting value, or possibility value, within a range of values. By way of example, if a peak within the pulse height data exhibits strong characteristics (i.e., the peak is tall relative to surrounding values and symmetrical) in may be assigned a high value, i.e., a 0.9 in a range of 0 to 1. A peak that does not exhibit such strong characteristics may be assigned a low value, such as 0.1.

Measurements taken by portable radiation detectors are subject to numerous variables, e.g., the distance between the radioactive material and the detector is unknown, the radioactive material is of an unknown form (gas, liquid, or solid) and an unknown geometry, and intermediary barriers may impede or vary the transmission of the gamma rays. The fuzzy logic component is better suited to adapt to the variables of in-field analysis than conventional in-field identification methods.

In one embodiment, the fuzzy logic component may comprise a peak search component, peak analysis component, energy-level component, matching component, library, and ranking component, or a subcombination thereof. The peak search component produces peak search data by analyzing pulse height data produced by the MCA. The peak search data contains information about possible peaks within the pulse height data.

The peak analysis component may analyze the peak search data and produce a weighting value indicating the significance and symmetry of a particular peak, resulting in a peak analysis weighting value. In one embodiment, the peak analysis component may comprise a peak significance component, a peak symmetry component, and a peak parity component. These three components may produce weighting values that may contribute to the peak analysis weighting value.

In one implementation, the library contains a listing of radioisotopes and characteristics of pulse height data corresponding to those radioisotopes. The energy-level component may use fuzzy logic to compare energy levels of peaks from the pulse height data produced by the handheld CZT radiation detector to peaks from radioisotopes in the library. An energy-level weighting value indicates how closely the energy levels of two such peaks match.

The matching component may use peak analysis weighting values and energy-level weighting values to produce a listing of radioisotopes, that most closely match the pulse height data produced by the handheld CZT radiation detector. In one embodiment, a ranking component will rank each radioisotope according to how closely it matches the pulse height data.

In one embodiment, the handheld CZT radiation detector may further comprise a neutron sensor to produce an indicator when neutrons are detected. The neutron sensor may comprise a helium-3 proportional counter. Helium-3 proportional counters are well-known and understood by those skilled in the art. The neutron detector provides an additional method of detecting the presence of radioisotopes when gamma rays may be shielded by a barrier.

The handheld CZT radiation detector may further comprise a display component coupled to the analysis component (e.g., a fuzzy-logic component) and the neutron sensor. In one embodiment, the display component comprises a personal data assistant for receiving the ranked listing of radioisotopes and the indicator and displaying a visual indication thereof. Incorporating a personal data assistant into this device makes the handheld CZT radiation detector more user-friendly, as individuals are generally familiar with personal data assistants.

An interface places the analysis component (e.g., a fuzzy-logic component) and neutron sensor in electrical communication with the display component. In one embodiment, the interface may comprise, for example, a serial port or an infrared port. The interface may convey a signal containing either the ranked listing of radioisotopes, the indicator of the presence of neutrons, or both to a display component. In one embodiment, the interface is configured for two-way communication, both to send and receive data.

In one implementation, the CZT, gammy-ray sensor, processor, memory, MCA, analysis component, neutron sensor, and interface, or a subcombination thereof may be received by the first housing. In such a configuration, the handheld CZT radiation detector is resistant to damage and easily transportable. The first housing may be sized to be held in a person's hand. Sized to be held in a person's hand means that the handheld CZT radiation detector can comfortably be held in one hand and operated with the other hand.

Also, the first housing may have a recess for receiving a display component, such as a personal data assistant, which may be situated within a second housing. In one embodiment, the personal data assistant may communicate with the sensor and neutron detector via the interface when the personal data assistant is placed in the recess.

These features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 15 is a table illustrating one embodiment of a ranking component that may be employed in connection with the fuzzy-logic component.

DETAILED DESCRIPTION OF THE PREFERRED EMBODIMENTS

The presently preferred embodiments of this invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 15, is not intended to limit the scope of the invention, as claimed, but is merely representative of presently preferred embodiments of the invention.

Throughout the following disclosure, the term "coupled" may be used to refer to components that are either directly connected or linked by one or more other components. Thus, as used herein, the term "coupled" may be synonymous with "in electrical communication with" or simply "in communication with."

Furthermore, those skilled in the art will understand that while many components described herein may be implemented as software modules, they may be also implemented as hardware or a combination of both hardware and software. The reverse is also true. Many hardware components may likewise be implemented as software components, or a combination of hardware and software components.

Reference throughout this specification to "one embodiment" of "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
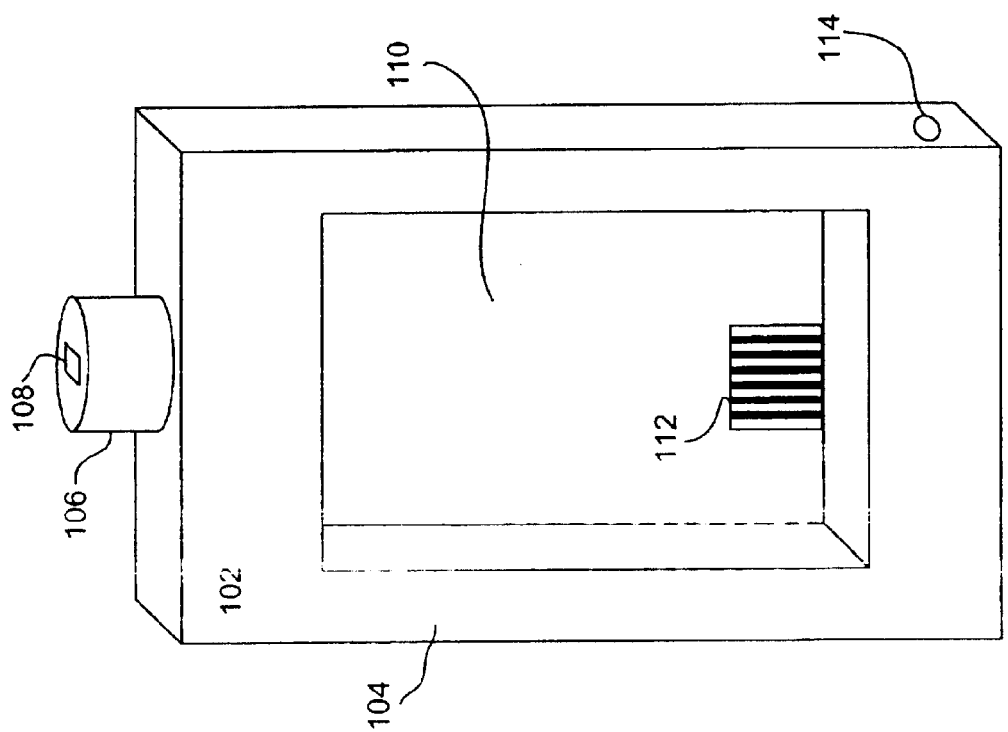
FIG. 1 is a perspective view of one embodiment of a handheld CZT radiation detector.

FIG. 1 is a perspective view of one embodiment of a handheld cadmium zinc telluride (CZT) radiation detector 102. A first housing 104 receives and combines many sub-elements of the handheld CZT radiation detector 102 into a unitary apparatus. The first housing 104 is sized to be held in a person's hand. Sized to be held in a person's hand means that the handheld CZT radiation detector 102 can comfortably be held by a person in one hand and operated with the other hand, just as a personal data assistant (e.g., a Palm Pilot® made by Palm, Inc. or a Handspring Visor® made by Handspring, Inc.). Thus, the handheld CZT radiation detector 102 is smaller than a laptop or notebook computer, but just slightly larger than a personal data assistant. As PDA's continue to decrease in size, the detector 102 may also decrease in size correspondingly. In one embodiment, the handheld CZT radiation detector 102 is about seven inches by four inches by one-half inch in size and weighs approximately three pounds. The handheld CZT radiation detector 102 is substantially smaller than conventional portable radiation detection devices.

In one embodiment, the housing 104 comprises a mounting cup 106. The mounting cup 106 may house a CZT crystal 108 for use in connection with the handheld CZT radiation detector 102. A CZT crystal 108 is a wide-bandgap, semiconductor and may be used in connection with a gamma-ray detector. The mounting cup 106 is specifically designed to preserve and protect the CZT crystal 108 in the rugged conditions of day-to-day use by untrained operators. In one embodiment, the CZT crystal 108 is placed within a rectangular portion of the handheld CZT radiation detector 102.

Figure 2:
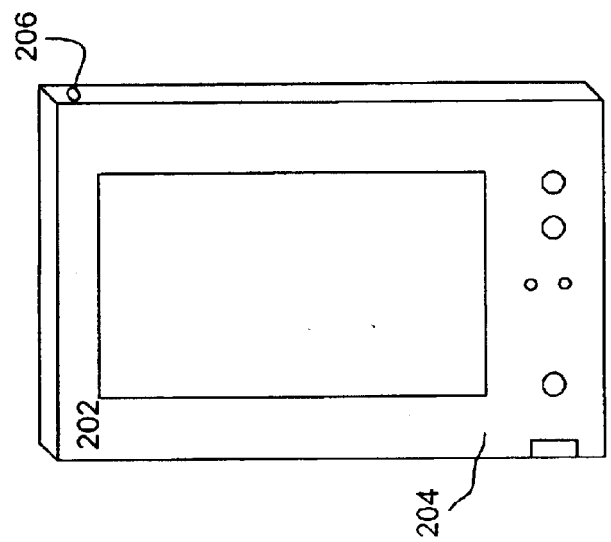
FIG. 2 is a perspective view of one embodiment of a display component of the handheld CZT radiation detector.

Referring now to both FIGS. 1 and 2, in one implementation, the first housing 104 may further comprise a recess 110. The recess 110 may be configured, or sized, to receive a display component 202. The display component 202 may be situated within a second housing 204. In one embodiment, a display component 202 may include a personal data assistant. Alternatively, the display component 202 may be a conventional display screen, such as a conventional gas plasma, LCD screen, and the like. Thus, the first housing 104 has a recess 110 configured to subtend, or surround and provide support to, the second housing 204.

Incorporating a personal data assistant into this device makes the handheld CZT radiation detector 102 more user-friendly. Many individuals are already familiar with personal data assistants. The screens are relatively large and easy to read. The buttons are simple and likewise offer an interface familiar to many consumers. Thus, unlike conventional high-purity germanium radiation detectors, handheld CZT radiation detector 102 may be used by nonscientists and untrained operators.

The handheld CZT radiation detector 102 may further comprise an interface or, more specifically, an interface for conveying a signal containing data from components contained in the first housing 104 to other devices or components, such as the display component 202. In one embodiment, the interface may comprise a serial port 112, an infrared port 114, or both. Both the serial port 112 and infrared port 114 may be configured to transmit and receive data. Serial 112 and infrared ports 114 are well known in the industry and understood by those skilled in the art.

The serial 112 and infrared 114 ports are merely examples of known data transmission ports. For example, the interface may further comprise a parallel port, bi-directional parallel port, USB port, a radio frequency transceiver, and the like. In one embodiment, the display component 202 may be integrated with remaining components of the handheld CZT radiation detector 102.

Figure 3:
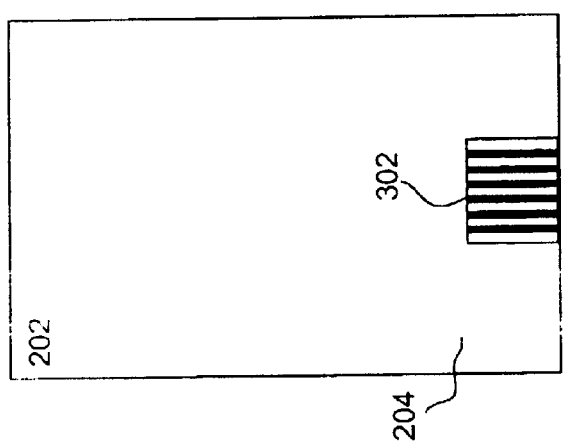
FIG. 3 is a rear view of one embodiment of a display component.

The display component 202 may further comprise an infrared port 206 as shown in FIG. 2 and a serial port 302 as shown in FIG. 3, which is a rearview of the display component 202. Both the serial port 302 and infrared port 206 may receive and transmit data. In one embodiment, the display component 202 may contain a serial port 302 that interfaces with the serial port 112 on the first housing 104 when the display component 202 is placed within the recess 110. The infrared ports 114, 206 may be used for transmission of data between the display component 202 and components within the first housing 104.

Figure 4:
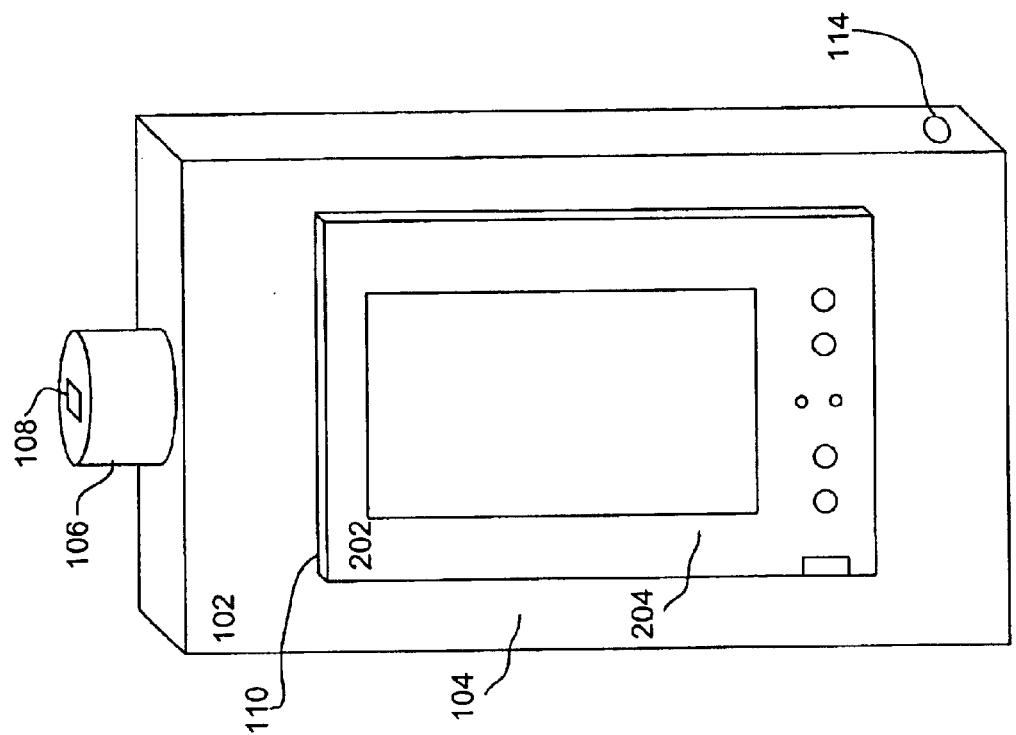
FIG. 4 is a perspective view of one embodiment of the handheld CZT radiation detector, including a display component thereof.

FIG. 4 is a perspective view of one embodiment of the handheld CZT radiation detector 102 interfaced with a display component 202, such as a personal data assistant. More specifically FIG. 4, illustrates how a display component 202, within a second housing 204, is placed in the recess 110 of the first housing 104. As stated above, the serial port 112 on the first housing 104 may be positioned so that it interfaces with a serial port 302 on the display component 202 when the personal data assistant is placed within the recess 110.

Figure 5:
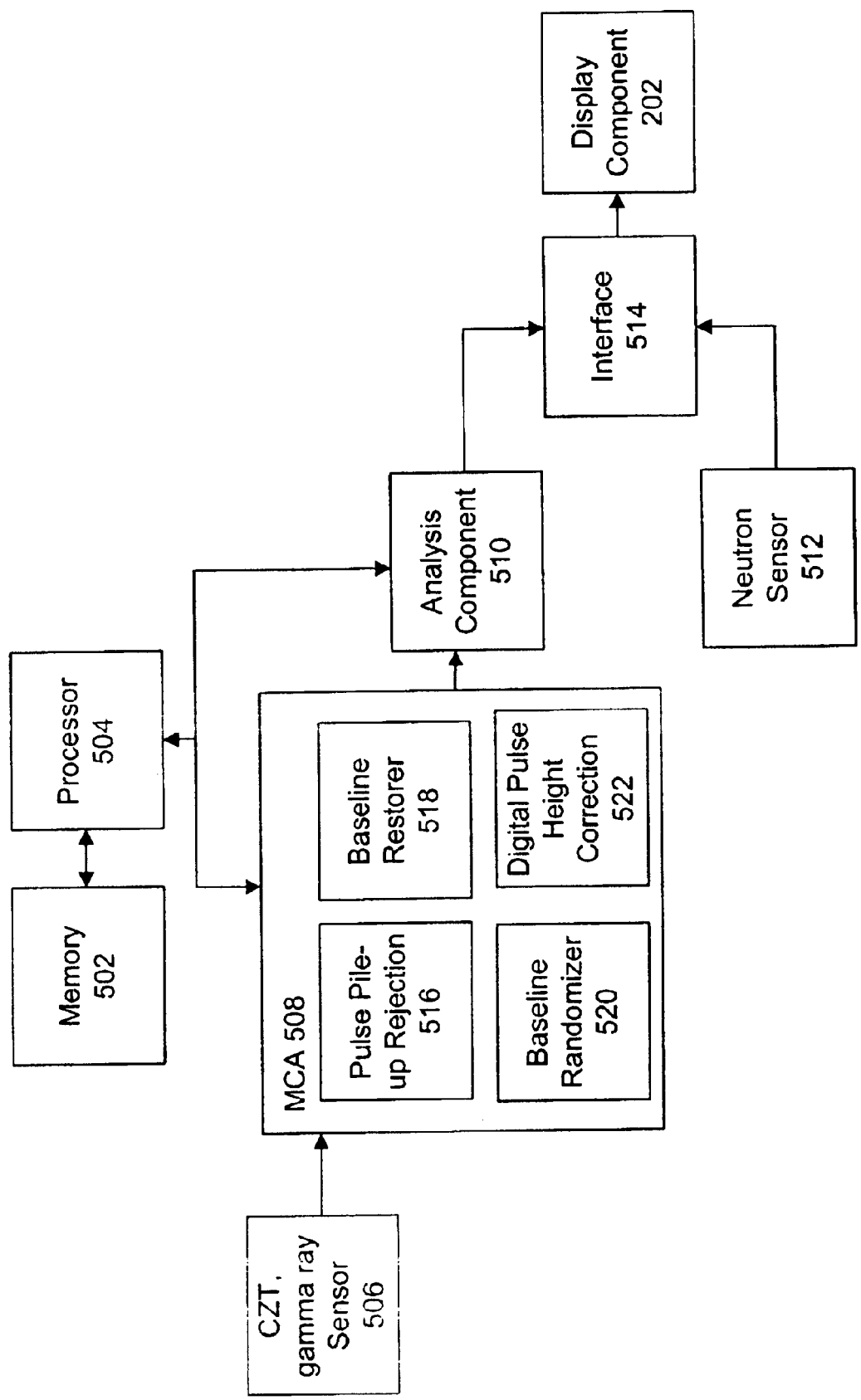
FIG. 5 is a block diagram of one embodiment of the handheld CZT radiation detector.

FIG. 5 is a block diagram of one embodiment of the handheld CZT radiation detector 102. The handheld CZT radiation detector 102 may be implemented using low-power electronics to extend battery life of the device 102. For example, in one embodiment, six high-power lithium batteries yield operating times in excess of 12 hours.

The handheld CZT radiation detector 102 may comprise a memory 502 coupled to a processor 504. The memory 502 may store instructions executable by the processor 504. In one embodiment, the memory 502 may include, for example, random access, read-only, or flash memory. Those skilled in the art will understand that numerous types of memory 502 may be implemented in connection with this device. In one embodiment, the processor 504 may include a CPU, microprocessor, RISC processor, and the like. Again, those skilled in the art will understand that numerous types of processors 504 may be implemented in connection with the handheld CZT radiation detector 102.

The handheld CZT radiation detector 102 may further comprise a sensor 506 for sensing gamma rays employing cadmium zinc telluride (CZT). The sensor 506 may be coupled to the processor 504. The sensor includes CZT gamma-ray sensors 506. A CZT gamma-ray sensor 506 may include any gamma-ray sensor using a CZT crystal 108 (illustrated in FIGS. 1, 4, and 5). The CZT crystal 108 may have an anode and a cathode, being biased by a high voltage power supply. In one embodiment, the CZT crystal 108 is a large-volume crystal. Large-volume crystals are at least 1 cubic centimeter in volume and thicker than 5 millimeters. This additional volume enables the capture of high-energy gamma rays, which will have a deeper interaction with the CZT crystal 108.

When a gamma ray interacts with a CZT crystal 108, a charge is produced. A CZT gamma-ray sensor 506 may further comprise circuitry for converting the charge into a shaped voltage pulse, which may be referred to as gamma-ray data. The amplitude of the shaped voltage pulse is proportional to the energy deposited on the CZT crystal 108 by a gamma ray. The circuitry noted above may include, for example, a charge-sensitive preamplifier and a shaping amplifier, CZT gamma-ray sensors 506 are known, and those skilled in the art will understand that such sensors may be configured in numerous ways and still fall within the scope of this invention.

Figure 6:
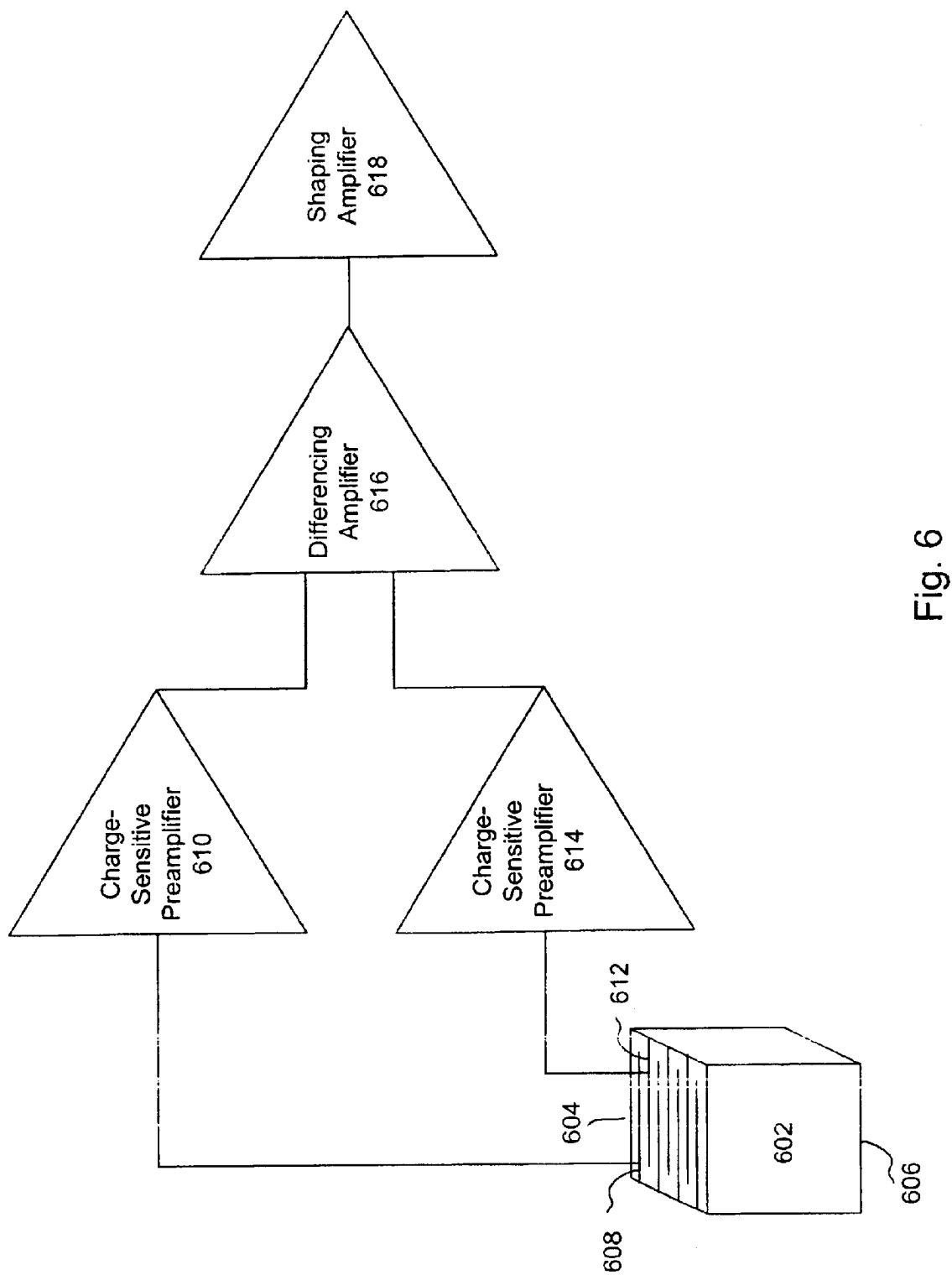
FIG. 6 is a block diagram of one embodiment of a coplanar-grid, CZT gamma-ray sensor.

CZT gamma-ray sensors 506 include, in one embodiment, a coplanar grid CZT gamma-ray sensor. Referring now to FIG. 6, a coplanar grid CZT gamma-ray sensor may include a coplanar-grid CZT crystal 602, having an anode 604 and a cathode 606 which bias the crystal 602. Parallel strips are deposited on a surface of the CZT crystal 602. A first set 608 of alternative, parallel strips is coupled to a first charge-sensitive preamplifier 610, and a second set 612 of alternative strips is coupled to a second charge-sensitive preamplifier 614. In one embodiment, the strips are made of gold or platinum. The strips form the anode 604 on the coplanar, CZT crystal 602. Coplanar grid CZT crystals 602 may be purchased from companies such as eV Products of Saxonburg, Pa.

The first set 608 of strips is biased slightly higher than the second set 612 so that the first set 608 collects the charge produced by a gamma-ray interaction with the CZT crystal 602. The second set 612 of strips serves to sense charge motion in the crystal 602. A differencing amplifier 616 subtracts the signals from the first 610 and second 614 preamplifiers, thus eliminating the effect of charge motion within the CZT crystal 602. A shaping amplifier 618 then shapes the voltage pulse. One purpose of the shaping amplifier is to cut off a tail of the voltage pulse to increase the number of pulses that may be processed in a fixed period of time. Because the signal produced by the differencing amplifier 616 is the same independent of where the electrons originate, use of this technique removes a great deal of noise and produces excellent resolution. In one embodiment, a portion of the induced signal received by the second set 612 is added back to flatten electron induction efficiency. Coplanar grid CZT gamma-ray sensors are known, and those skilled in the art are familiar with the numerous ways in which such sensors may be configured and still fall within the scope of this invention.

Use of a coplanar grid CZT gamma-ray sensor in a portable device results in a number of advantages over conventional portable radiation detectors. Coplanar grid CZT gamma-ray sensors operate correctly in a wide range of temperatures, unlike conventional high-purity germanium detectors, which operate correctly only at liquid-nitrogen temperatures. More specifically, in one embodiment, the handheld CZT radiation detector 102 operates correctly at temperatures ranging from about −10° to about +50° Celsius. In addition, a coplanar grid CZT gamma-ray sensor provides far superior resolution to conventional scintillators, as will be illustrated in connection with FIG. 10.

Referring once again to FIG. 5, the handheld CZT radiation detector 102 may further comprise a multichannel analyzer (MCA) 508 for performing multi-channel analysis. In one embodiment, the MCA 508 is coupled to the sensor 506 and processor 504. An MCA 508 is configured to produce pulse height data corresponding to the gamma-ray data. Stated more precisely, the MCA 508 receives a shaped voltage pulse (gamma-ray data), which is proportional to the energy deposited on a CZT crystal 108. The MCA 508 converts the voltage pulse into a digital number indicating the height of the pulse. An analog-to-digital converter may perform this conversion. The MCA 508 then categorizes the pulse into an energy level range, which is often referred to as a channel. The energy level range is frequently measured in kiloelectron volts (KeVs). The MCA 508 keeps track of the number of pulses (or counts) received in a given channel. In one embodiment, the MCA 508 divides a spectrum from 0 to 1500 KeVs into 512 channels. The count patterns, or pulse height data, produced by the MCA 508 may be employed to determine, for example, the composition of a radioisotope being analyzed. Thus, the MCA 508 is configured to produce pulse height data corresponding to the gamma-ray data.

Figure 7:
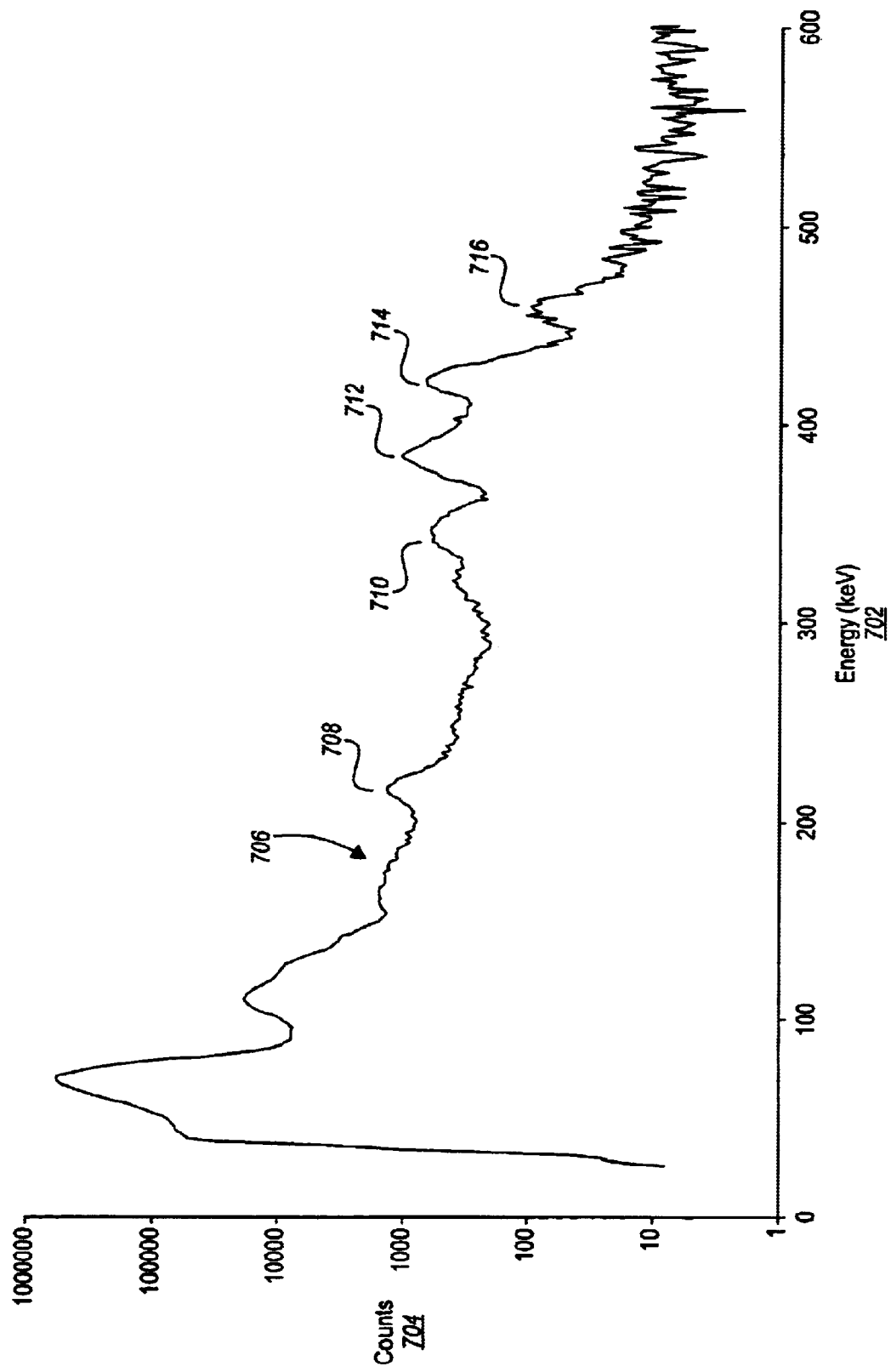
FIG. 7 is a graph illustrating pulse data produced by the handheld CZT radiation detector.

FIG. 7 is a graphical display of pulse height data 706 produced by the handheld CZT radiation detector 102. This graphical display comprises a horizontal axis indicating various energy levels 702 (or channels) in kiloelectron volts (KeV) and a vertical axis indicating the number of counts 704 (or pulses received) at a particular energy level 702. The pulse height data 706 of FIG. 7 illustrates the energy characteristics of gamma rays produced by plutonium-239. Note the discrete peaks shown at 203 KeV (708), 330 KeV (710), 375 KeV (712), 414 KeV (714), and 451 KeV (716), which are characteristic of plutonium-239.

Referring again to FIG. 5, the MCA 508 may employ numerous techniques to improve the accuracy of the pulse height data. For example, in one embodiment, the MCA 508 may include a pulse pile-up rejection component 516, a baseline restorer component 518, a baseline randomizer component 520, and a digital pulse height correction component 522, or a subcombination thereof. Pulse pile-up rejection component 516 minimizes spectral distortion and rejects pulses that are received when a prior pulse is being processed by the MCA 508. In one implementation, the pulse pile-up rejection component 516 is led by two shaping amplifiers (a fast pulse and slow pulse shaping amplifier) from the CZT, gamma ray sensor 506 to determine when pulse pile-up condition exists. A baseline restorer component 518 may be implemented to maintain the baseline of incoming pulses at a proper level, even when pulses are received at a very high rate. The baseline restorer component 518, in one embodiment, may be a digital baseline restorer. A baseline randomizer component 520 adds varying values to the incoming data and then later subtracts those values out to increase the reliability of the MCA 508.

In addition, in one embodiment, the resolution of the handheld CZT radiation detector 102 may be further enhanced by a digital pulse height correction component 522, which corrects the pulse height based on the interaction depth of a gamma ray. This digital correction component 522 produces better resolution and can compensate for defects in a CZT crystal 108 that would otherwise render the crystal 108 unusable. To determine the interaction depth of the gamma ray, the resulting charge must also (in addition, to collecting a signal at the anode) be collected at the cathode, shaped, and converted to a digital value with an analog-to-digital converter. The ratio of the anode signal and the cathode signal is proportional to the interaction depth. In this embodiment, the MCA 508 generates pulse height data—or, in other words, pulse height distributions—corresponding to gamma ray interactions that occur at a particular interaction depth. Employing this pulse height data, the CZT crystal's 108 induction efficiency may be determined experimentally. Pulse height correction is then based upon this experimentally determined induction efficiency. To generate the digitally corrected pulse height distribution, the MCA 508 corrects the measured pulse height at the anode by an amount determined by the interaction depth and the induction efficiency. These and other analogous methods are known. As a consequence, those skilled in the art understand that many such techniques may be employed in connection with the MCA 508, still coming within the scope of this invention.

The handheld CZT radiation detector 102 may further comprise an analysis component 510 for compiling a ranked listing of radioisotopes corresponding to the pulse height data. The radioisotopes are ranked by how closely they fit the pulse height data. The analysis component 510 may be coupled to the MCA 508 and processor 504. The analysis component 510 may be implemented as software operating in connection with a processor 504 and memory 502, as a hardware component, or as a combination thereof.

In one embodiment, the analysis component 510 may comprise a fuzzy-logic component. Counting statistics and measurement geometries can mask or hide usually prominent features in pulse height data. Crisp logic methods define criteria that categorize an event as either belonging to a set or not. Fuzzy logic does not involve such discrete categorizations, but involves an assigned weighting value, or possibility value, within a range of values. By way of example, if a peak within the pulse height data exhibits strong characteristics (i.e., the peak is tall relative to surrounding values and symmetrical) in may be assigned a high value, i.e., a 0.9 in a range of 0 to 1. A peak that does not exhibit such strong characteristics may be assigned a low value, such as 0.1. Thus, the fuzzy-logic component is better suited to adapt to the variables of in-field analysis than conventional in-field identification methods.

Furthermore, in one embodiment, the fuzzy-logic component is computationally less intensive than prior analysis methods, thus extending the battery life of the handheld CZT radiation detector 102 and providing more timely results to an end-user. Not only is the fuzzy-logic component more computationally efficient, but it often produces more accurate results than conventional scintillators. Implementing conventional techniques, such as the chi-square analysis, simply requires too much computational power to be conveniently used in connection with a portable device. A more detailed description of the fuzzy-logic component is provided in connection with FIGS. 11–15.

Still referring to FIG. 5, the handheld CZT radiation detector 102 may further comprise a neutron sensor 512 to produce an indicator when neutrons are detected. The neutron sensor 512 may comprise a helium-3 proportional counter, such as those produced by Reuter-Stokes, Inc., of Twinsburg, Ohio. Helium-3 proportional counters are well-known and understood by those skilled in the art.

Figure 8:
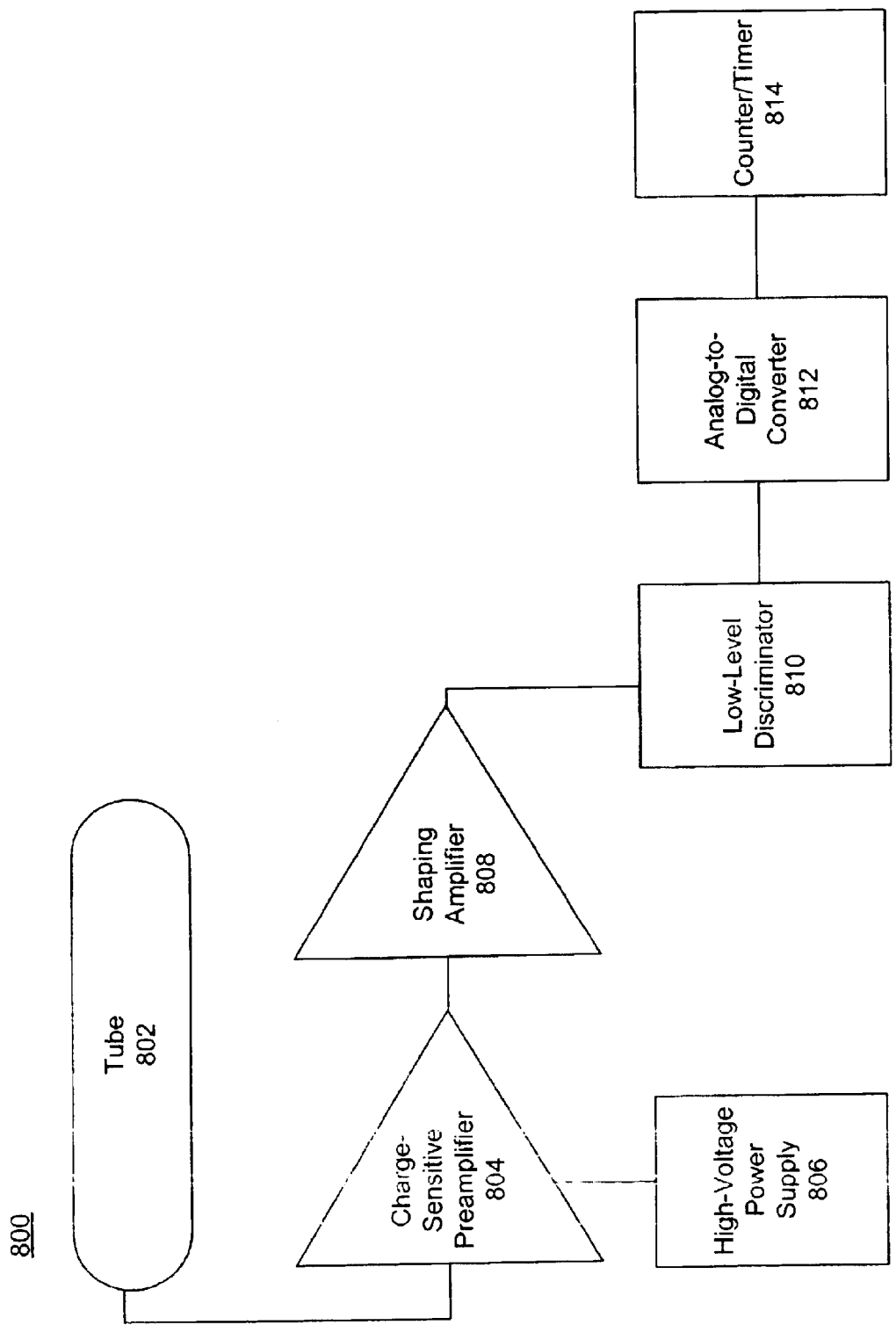
FIG. 8 is a block diagram of one embodiment of a proportional helium-3 counter, which may be implemented in connection with the handheld CZT radiation detector.

FIG. 8 illustrates one embodiment of a helium-3 proportional counter. The helium-3 proportional counter 800 may comprise a tube 802 containing helium-3, a charge-sensitive preamplifier 804, a high voltage power supply 806, a shaping amplifier 808, a low-level discriminator 810, an analog-to-digital converter (ADC) 812, and a counter/timer 814. The high voltage power supply 806 is coupled to charge-sensitive preamplifier 804 and biases the helium-3 in the tube 802. When a neutron interacts with the helium-3 in the tube 802, a proton, a triton, and a charge are produced. The charge may be detected by the charge-sensitive preamplifier 804, which produces a voltage pulse. The voltage pulse is then shaped by a shaping amplifier 808. The low-level discriminator 810 determines whether the pulse is sufficiently large to indicate the presence of the neutron. Often, the threshold value is a quarter volt. If this threshold value is meet or surpassed, the ADC 812 then digitizes the pulse. The digitized pulses are counted by the counter/timer 814 to determine a count rate of incoming neutrons. Thus, in one implementation, the indicator may comprise a number indicating how many neutrons have been detected within a fixed period of time.

The neutron sensor 512 provides the handheld CZT radiation detector 102 with an additional method of detecting radioactive materials. For example, a lead barrier may shield gamma rays from detection. However, neutrons may be detected even though a radioactive material is separated from the detector by a lead barrier. Thus, the handheld CZT radiation detector 102 provides its users with an enhanced ability to detect the presence of radioisotopes.

The handheld CZT radiation detector 102 may interface with a display component 202. The display component 202 may be coupled to the analysis component 510, the neutron sensor 512, or both. In one embodiment, the display component 202 may be integrated with (e.g., in the same housing as) other components, such as the analysis component 510 and the neutron sensor 512. The display component 202 receives the ranked listing of radioisotopes and the indicator and displays a visual indication thereof.

Figure 9:
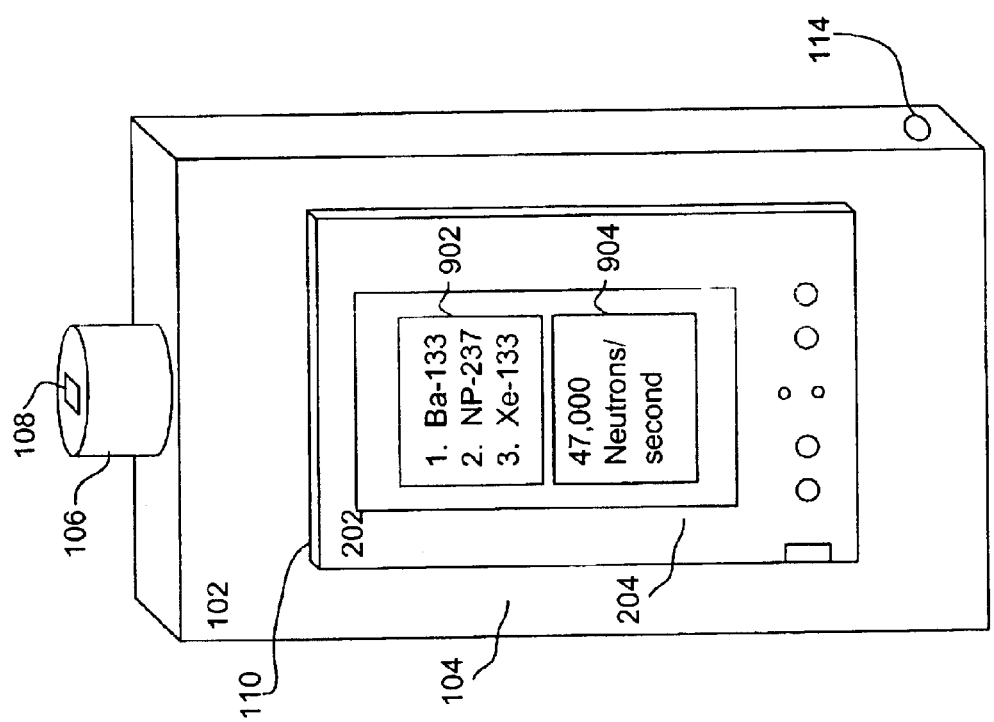
FIG. 9 is a perspective view of one embodiment of the handheld CZT radiation detector illustrating visual indications of a ranked listing of radioisotopes and an indicator produced by a neutron sensor.

FIG. 9 illustrates examples a visual indication 902 of the ranked listing and a visual indication 904 of the indicator on the display component 202. Many different configurations of visual indications 902, 904 convey the same information and thus fall within the scope of this invention.

Referring again to FIG. 5, an interface 514 places the analysis component 510 and neutron sensor 512 in electrical communication with the display component 202. In one embodiment, the interface 514 may comprise a serial port 112, infrared port 114 and the like, as discussed in connection with FIG. 1. The interface 514 may convey a signal containing either the ranked listing of radioisotopes, the indicator of the presence of neutrons, or both to a display component 202.

In one embodiment, the display component 202 comprises a personal data assistant that transmits a message instructing the neutron sensor 512 and the gamma ray sensor 506 to begin detection. In that embodiment, the interface 514 is configured to receive the message and instruct the neutron sensor 512 and gamma ray sensor 506 to begin detection. Again, the interface 514 may convey this message through, for example, the serial 112 or infrared 114 port. Thus, in one implementation, the infrared 114 and serial 112 ports are configured for two-way communication, both to send and receive data.

A combination of the CZT, gammy-ray sensor 506 (e.g., the coplanar grid CZT gamma-ray sensor), processor 504, memory 502, MCA 508, analysis component 510, neutron sensor 512, and interface 514 are sized to be held in a person's hand. Again, as stated before, sized to be held in a person's hand means that the handheld CZT radiation detector 102 can comfortably be held in one hand and operated with the other hand. Thus, the CZT, gammy-ray sensor 506, processor 504, memory 502, MCA 508, analysis component 510, neutron sensor 512, and interface 514 may be received by the first housing 104, which is discussed in connection with FIGS. 1 and 4. In such a configuration, the handheld CZT radiation detector 102 is resistant to damage and easily transportable.

Figure 10:
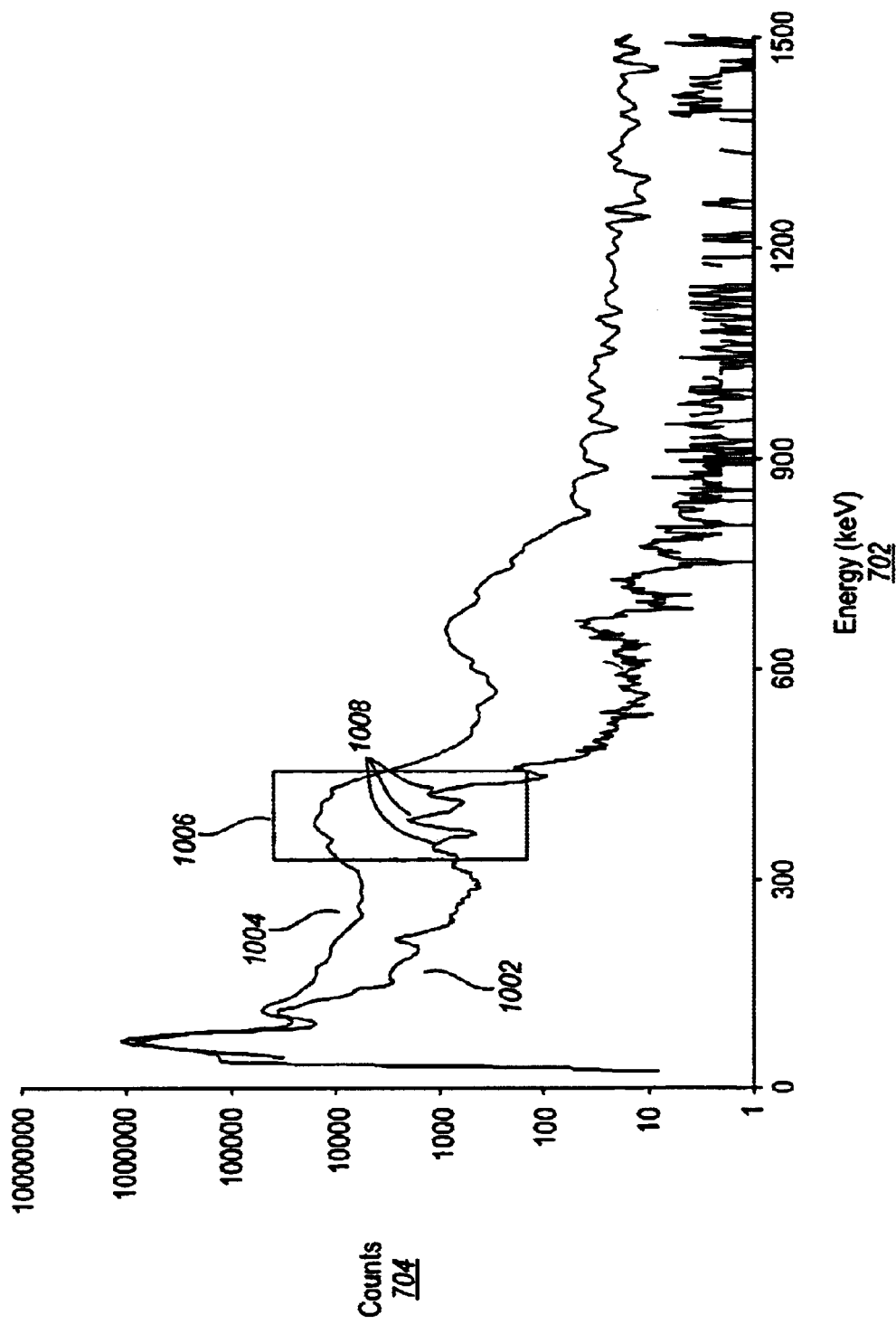
FIG. 10 is a pulse height distribution graph illustrating the superior resolution of the handheld CZT radiation detector relative to a conventional scintillator.

FIG. 10 illustrates a comparison between the handheld CZT detector 102 and a conventional scintillator. As shown, the pulse height data 1002 produced by the handheld CZT radiation detector 102 is superior to pulse height data 1004 produced by a conventional scintillator. In this illustration, both were exposed to plutonium-239. The handheld CZT radiation detector 102 has a resolution better than 3.5% full-width half-maximum (FWHM) at 662 KeV. In contrast, a conventional scintillator has a resolution of about 7% at the same energy level. Pulse height data 1002 produced by the handheld CZT radiation detector 102 reveals energy peaks simply not seen in pulse height data 1004 produced by a conventional scintillator. In particular, note three peaks 1008 are clearly revealed in a boxed region 1006 of the CZT pulse height data 1002. These peaks 1008 are almost indiscernible in the same energy level range on the scintillator pulse height data 1004, as shown in the boxed region 1006.

Thus, the handheld CZT radiation detector has numerous advantages over conventional portable radiation detectors. Most importantly, the higher resolution pulse height data enables far more effective automated radioisotope identification techniques in handheld devices. Specifically, the higher resolution enables effective use of fuzzy logic, a computationally less intensive algorithm than many previously used techniques, and results in more timely and accurate results than conventional scintillators. Methods based on pulse height data produced by conventional scintillators simply cannot identify radioisotopes with the accuracy of the handheld CZT radiation detector 102.

Figure 11:
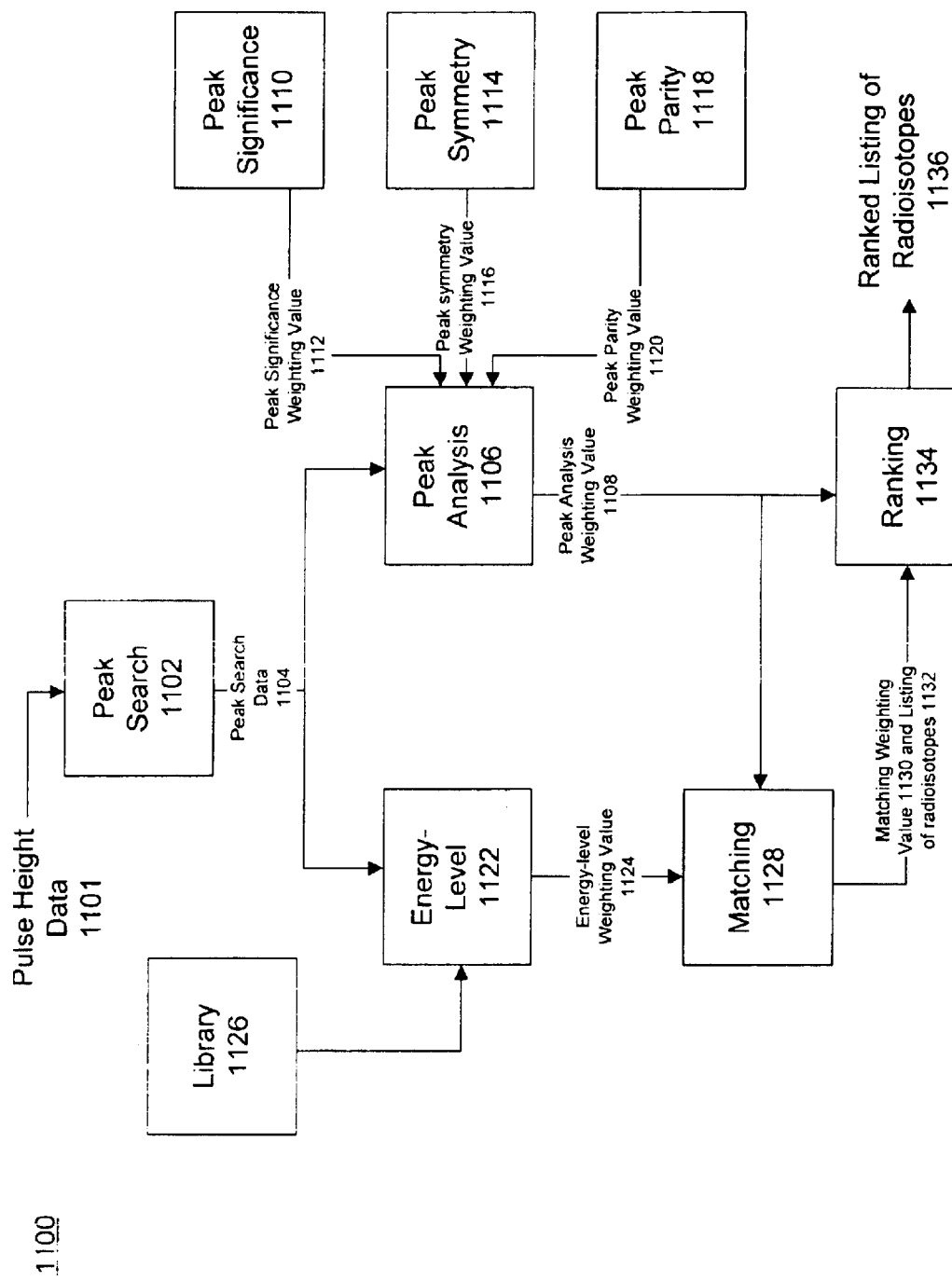
FIG. 11 is a block diagram of one embodiment of a fuzzy-logic component implemented by a handheld CZT radiation detector.

FIG. 11 is a block diagram of one embodiment of a fuzzy-logic component 1100 implemented by the handheld CZT radiation detector 102. The fuzzy logic component 1100 is one embodiment of the analysis component 510, illustrated in FIG. 5. The use of fuzzy logic marks a substantial advancement in portable radiation detectors. Measurements taken by portable radiation detectors are subject to numerous variables, i.e., the distance between the radioactive material and the detector is unknown, the radioactive material is of an unknown form (gas, liquid, or solid) and an unknown geometry, and intermediary barriers may impede or vary the transmission of the gamma rays. In one aspect, fuzzy logic refers to use of weighting values to determine whether gathered data (e.g., a peak's symmetry or energy level) conforms to a particular set of characteristics. The flexibility of fuzzy logic enables better detection and radioisotope identification in the varying circumstances of in-field analysis. The following description is exemplary of one embodiment of the fuzzy-logic component 1100 and others may be used. In one embodiment, when two values are subtracted or compared, an absolute value of the result is taken so that a sign of the result will not adversely impact operation of the fuzzy logic component 1100.

The fuzzy-logic component 1100 may comprise a peak search component 1102. The peak search component 1102 produces peak search data 1104 by analyzing pulse height data 1101 produced by the MCA 508. In one embodiment, the peak search component 1102 implements a second-derivative-based approach to identify possible peaks. The peak search component 1102 may, for example, implement a second-derivative approach with a simple rectangular smoothing kernel. This technique expedites the discovery of peaks with the limited resources of a handheld device. More precise techniques may be used, but would increase execution time and may yield nuisance values. In this embodiment, as a second derivative of the pulse height data is calculated, it is also normalized to a standard deviation of the total counts within the smoothing kernel.

Figure 12:
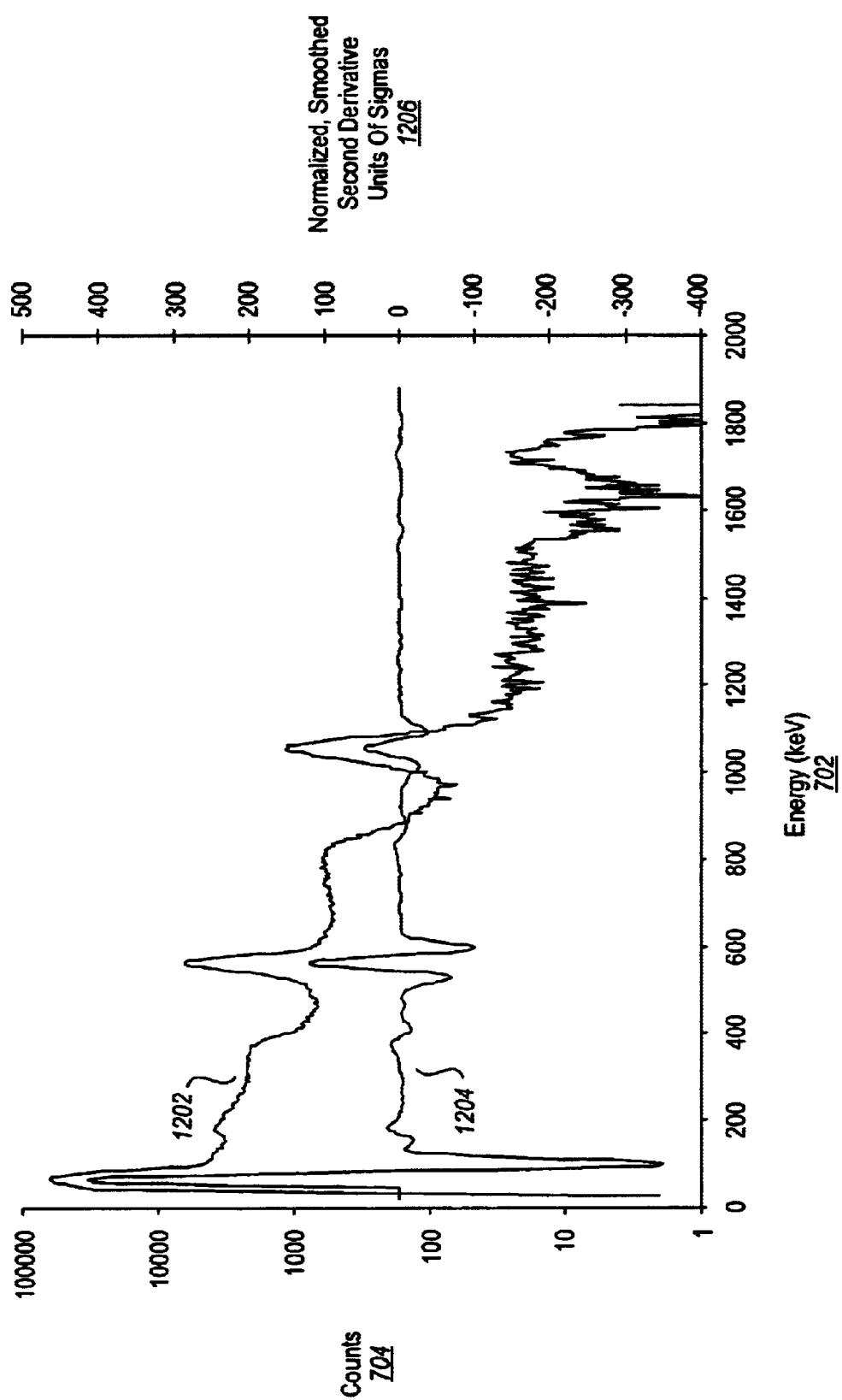
FIG. 12 illustrates a pulse height distribution graph juxtaposed with a smoothed, normalized second derivative thereof as implemented by a fuzzy-logic component.

FIG. 12 is a graph illustrating the pulse height data 1202 corresponding to Bismuth-207 juxtaposed with a graph of a normalized, smoothed second derivative 1204 thereof. The units on the left of the graph are counts 704 received in a given energy level 702 (or channel), while the units on the right of the graph are units relating to a normalized, smoothed second derivative 1204 of the pulse height data 1202 and may be referred to as sigmas ($\sigma$) 1206.

Referring once again to FIG. 11, to identify possible peaks, the normalized, smoothed second derivative 1204 of the pulse height data is examined for local maxima and minima. In one embodiment, a maximum must be three sigma 1206 in height and bordered on either side by a minimum to define a range-of-interest. As a consequence, the peak search data 1104, in one embodiment, comprises local maxima and minima, the original pulse height data 1202, and the normalized, smoothed second derivative 1204 thereof.

The fuzzy-logic component 1100 may further comprise a peak analysis component 1106. The peak analysis component 1106 produces a peak analysis weighting value 1108 by analyzing the peak search data 1104. Speaking broadly, a peak analysis weighting value 1108 indicates a significance of a corresponding peak within the pulse height data 1101. The peak analysis component 1106 implements weighting values. In one embodiment, the weighting values range from 0 to 1.

Figure 13:
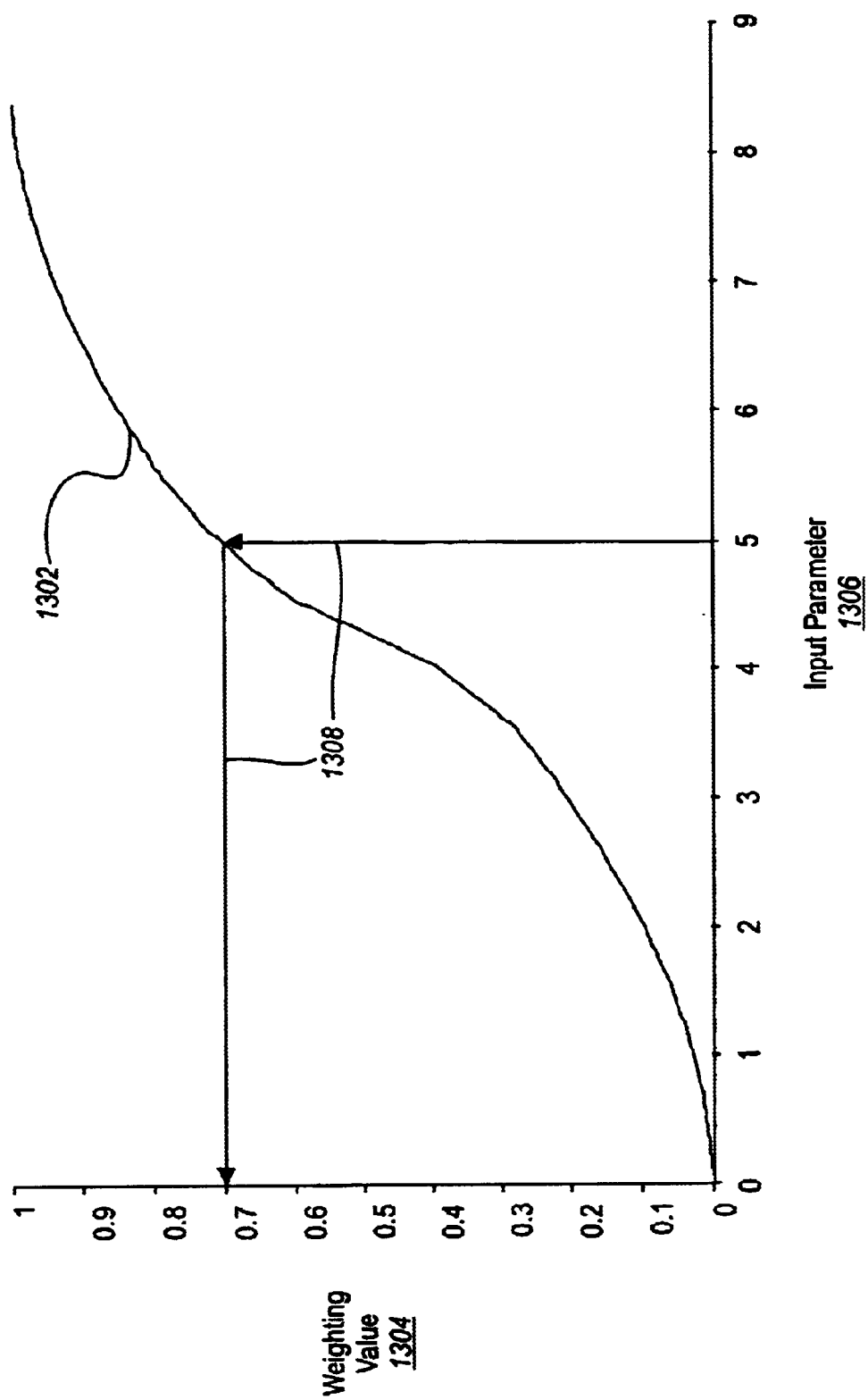
FIG. 13 illustrates a piece-wise approximation of a sigmoid for use in determining a weighting value in connection with one embodiment of the fuzzy-logic component.

Weighting functions, $\mu(x)$, may be used to calculate weighting values. Weighting functions may be implemented using a piece-wise approximation to a Sigmoid. Such an approximation of a sigmoid 1302 is illustrated in FIG. 13. There, the weighting value 1304 is shown on a y-axis, while an input parameter 1306 is shown on a x-axis. The input parameter 1306 defines a possible range of values, which may correspond to a particular weighting value 1304. For example, assume that the possible values range from 0 to 9. An input parameter 1306 greater than 9 yields of weighting value 1304 of 1, while an input parameter 1306 less than or equal to 0 yields a weighting value 1304 of 0. As illustrated by two arrows 1308, an input parameter 1306 of 5 corresponds to a weighting value 1304 of approximately 0.7. In one embodiment, the sigmoid 1302 may be altered by modifiers such as "~very" or "~somewhat" to make the transition between 0 and 1 more crisp in the case of "~very" or more fuzzy in the case of "~somewhat." In one implementation, the processor 504 (from FIG. 5) contains a table, simulating the sigmoid 1302, from which weighting values 1304 may be obtained by submitting an input parameter 1306 to the processor 504.

Referring again to FIG. 11, in one implementation, logical operators are used instead of conventional arithmetic operators in combine, or analyze, multiple weighting values. For example, an "~and" represents the intersection of two adjacent weighting values and returns the minimum of the two values. An "~or" represents the union of two adjacent weighting values and returns the maximum of the two values.

For example, the peak analysis weighting value (Peak) 1108 may in one implementation, be defined by the equation:

$$\sim Peak = \sim \sigma_{net} \sim and \sim \Delta E \sim and \sim \Delta \sigma.$$

where $\sim\sigma_{net}$ represents a peak significance weighting value 1112, $\sim\Delta E$ represents a peak symmetry weighting value 1116, and $\sim\Delta\sigma$ represents a peak parity weighting value 1120. Because the $\sim$and operator is used in this equation, the $\sim$Peak value will be the minimum of the peak significance weighting value 1112, peak symmetry weighting value 1116, and peak parity weighting value 1120. Each of these weighting values 1304 will be briefly discussed in connection with FIG. 11 and then later, in more detail, in connection with FIG. 14.

Still with reference in FIG. 11, the peak analysis component 1106 may additionally comprise a peak significance component 1110, which produces a peak significance weighting value 1112 ($\sim\sigma_{net}$). As the name implies, the peak significance weighting value 1112 indicates the significance, or size, of a corresponding peak.

The peak analysis component 1106 may additionally comprise a peak symmetry component 1114, which produces a peak symmetry weighting value ($\sim\Delta E$) 1116. The peak symmetry weighting value 1116 indicates whether right- and left-hand portions of a peak are symmetrical from a horizontal perspective (in terms of energy level spanned thereby).

The peak analysis component 1106 may further comprise a peak parity component 1118, which produces a peak parity weighting value ($\sim\Delta\sigma$) 1120. The peak parity weighting value 1116 indicates whether right- and left-hand portions of a peak are symmetrical from a vertical perspective (in terms of sigmas spanned thereby).

In various embodiments, the peak analysis component 1106 may comprise the peak significance component 1110, the peak symmetry component 1114, the peak parity component 1118 (joined by the "$\sim$and" or "$\sim$or" operators) or any sub-combination thereof.

Figure 14:
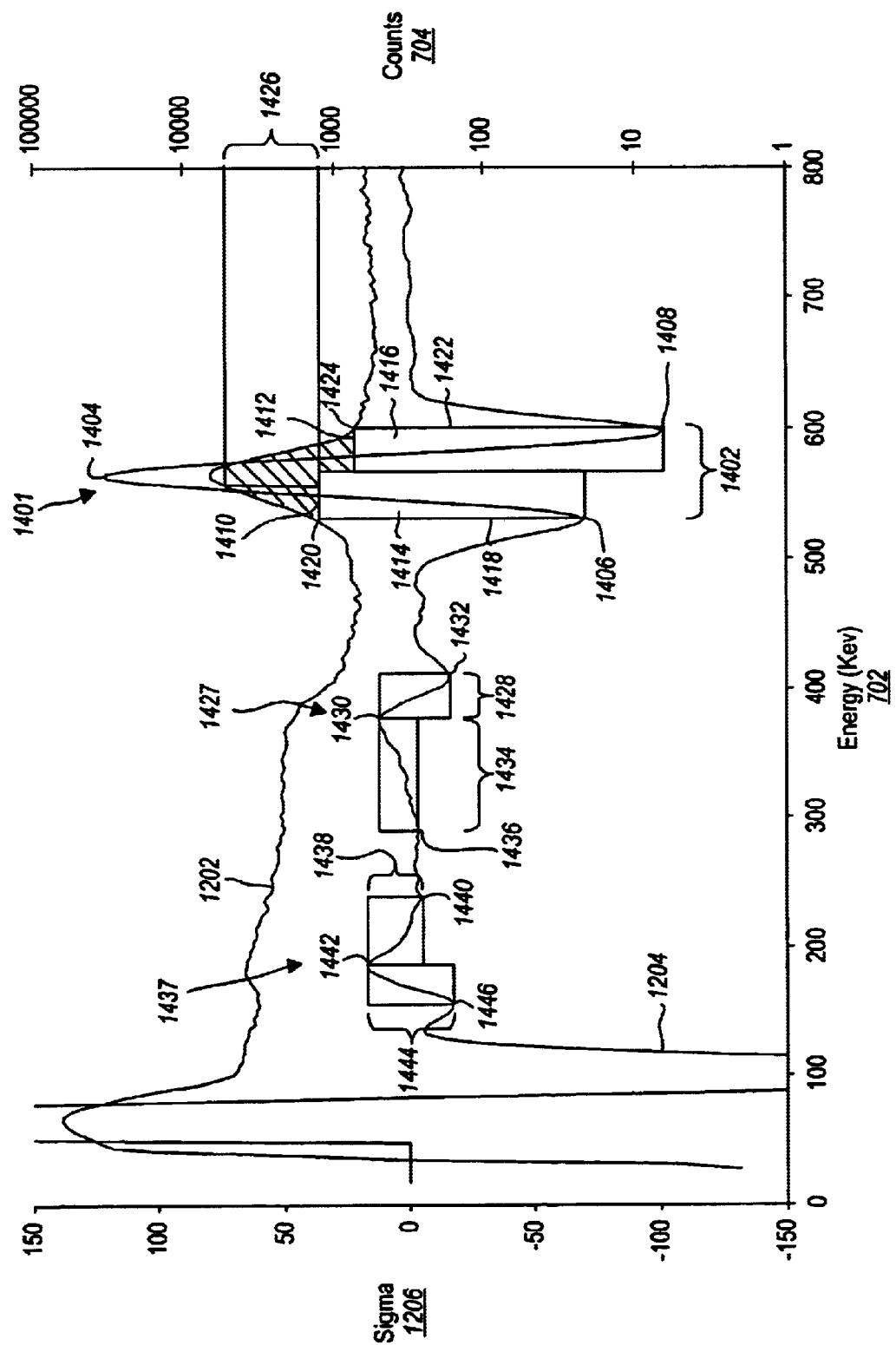
FIG. 14 is a pulse height distribution graph juxtaposed with a smoothed, normalized second derivative thereof illustrating various aspects of one embodiment of a peak analysis component as implemented in connection with a fuzzy-logic component.

FIG. 14 illustrates the calculations of the peak significance parity weighting value 1112, peak symmetry weighting value 1116, and peak parity weighting value 1120 on separate peaks. Separate peaks are used only for illustrative purposes. In one implementation, a peak significance weighting value 1112, a peak symmetry weighting value 1116, and the peak parity weighting value 1120 may be derived from each valid peak.

A rightmost peak 1401 illustrates one method of calculating a peak significance weighting value 1112 ($\sim\sigma_{net}$). A range-of-interest 1402 may be defined by a local maximum 1404 (an inflection point) at least three sigma 1206 in height and having a local left minimum 1406 (an inflection point) and a local right minimum 1408 (again, an inflection point) on either side within the normalized, smoothed second derivative 1204. As stated before, the peak search component 1102 may identify inflection points within the normalized, smoothest second derivative 1204. A background of a local maximum 1404 may be defined by a left top side 1410 and a right top side 1412 of each two rectangles (a left 1414 and a right 1416 rectangle) beneath the local maximum 1404.

The left side 1418 of the left rectangle 1414 is defined by a vertical line from the local left minimum 1406 to a point (the upper-left point 1420) on the graph of the pulse height data 1202 directly above (i.e., on the same energy level as) the minimum 1406. The left top side 1410 of the left rectangle 1414 is defined by a horizontal line from the upper-left point 1420 to a point directly below (i.e., on the same energy level as) the maximum 1404 of the peak.

As one would expect, the right side 1422 of the right rectangle 1416 is defined by a vertical line from the local right minimum 1408 to a point (the upper-right point 1424) on the pulse height data 1202 directly above the minimum 1408. The right top side 1412 of the right rectangle 1416 is defined by a horizontal line from the upper-right point 1424 in a point directly below the maximum 1404 of the peak.

A net count is defined by a sum of vertical distances 1426 (measured in counts) between the top 1410, 1412 of the respective rectangle 1414, 1416 and each point on the pulse height data 1202 within the range-of-interest 1402. A peak significance value ($\sigma_{net}$)—note that this is not the peak significance weighting value 1112—may be calculated by dividing the net counts by a standard deviation of the net counts. Then, in one implementation, the following weighting value equation may be employed to convert the peak significance value ($\sigma_{net}$) into a peak significance weighting value ($\sim\sigma_{net}$) 1112:

$$\sim\sigma_{net} = \begin{cases} 0, \sigma_{net} < 2; \\ \mu(\sigma_{net}), 2, \sigma_{net}, 5, \\ 1, \sigma_{net} > 5. \end{cases}$$

Thus, if the peak significance value is 1.2, the peak significance weighting value 1112 will be 0. If the peak significance value is greater than 5, the peak significance weighting value 1112 will be 1. If the peak significance value falls between 2 and 5, the weighting function, as illustrated in FIG. 14, may be implemented to find the peak significance weighting value 1112. In this instance, the input parameter would range from 2 to 5.

Those skilled in the art will understand that many variations of this and other weighting value equations disclosed herein fall within the scope and spirit of this invention. For example, varying the number boundaries (2 and 5 above) still falls within the contemplated scope of this invention. Moreover, adding different boundary schemes (e.g., adding more number boundaries and applying distinct weighting functions or fixed values in the additional number boundaries) still falls within the scope of this invention.

A middle peak 1427 illustrates one method of calculating a peak symmetry weighting value ($\sim\Delta E$) 1116. A peak symmetry value ($\Delta E$) may be found by subtracting an energy level range 1428 of a right half of a peak (i.e., an energy level range from a local maximum 1430 to a local right minimum 1432) from an energy level range 1434 of a left half of a peak (i.e., an energy level range from a local maximum 1430 to a local left minimum 1436). The peak symmetry value ($\Delta E$), in one embodiment, may be converted into a peak symmetry weighting value 1116 ($\sim\Delta E$) through the following weighting value equation:

$$\sim\Delta E = \begin{cases} 0, 12 < \Delta E < -12; \\ \mu(\Delta E), -12 < \Delta E < -1; \\ \mu(\Delta E), 1 < \Delta E < 12; \\ 1, 1 > \Delta E > -1. \end{cases}$$

In this weighting value equation, a peak symmetry value ($\Delta E$) greater than 12 or less than $-12$ results in a peak symmetry weighting value ($\sim\Delta E$) of 0. A peak symmetry value ($\Delta E$) between 1 and $-1$ results in a peak symmetry weighting value ($\sim\Delta E$) of 1. Otherwise, a weighting function is used. The input parameter 1306 of such a weighting function ranges either from $-12$ or from $-1$ to 1 to 12. As discussed above, those skilled in the art understand that many variations of this weighting value equation fall within the scope and spirit of this invention.

A left peak 1437 illustrates one method of calculating a peak parity weighting value (~Δσ) 1120. A peak parity value (Δσ) may be calculated by subtracting a height 1438 of a right half of a peak (i.e., a vertical distance, measured in terms of sigmas 1206, from a local right minimum 1440 to a local maximum 1442) from a height 1444 of a left half of a peak (i.e., a vertical distance, measured in terms of sigmas 1206, from a local left minimum 1446 to a local maximum 1442). In one embodiment, the following equation may be implemented to convert the peak purity value (Δσ) into a peak parity weighting value (~Δσ) 1120 employing the following weighting value equation:

$$\sim \Delta\sigma = \begin{cases} 0, \Delta\sigma < -4; \\ \mu(\Delta\sigma), -4 < \Delta\sigma\ 10; \\ 1, \Delta\sigma > 10. \end{cases}$$

In this weighting value equation, a peak parity value (Δσ) less than −4 results in a parity weighting value (~Δσ) of 0. A peak parity value (Δσ) greater than 10 results in a peak parity weighting value (~Δσ) of 1. Otherwise, a weighting function is used. The input parameter 1306 of such a weighting function ranges from −4 to 10. As discussed above, those skilled in the art understand that many variations of this weighting value equation fall within the scope and spirit of this invention.

Referring again to FIG. 11, the fuzzy-logic component 1100 may have an energy-level component 1122, which produces an energy-level weighting value 1124 by comparing an energy level of a peak from the pulse height data to an energy level of a peak from a library 1126 of known isotopes. Stated differently, the energy-level component 1122 implements fuzzy logic to determine how closely the energy level of a peak from the pulse height data matches an energy level of a peak of a known isotope.

In one embodiment, the library 1126 contains entries describing the energy-levels, relative intensity, and requirement-to-be-present values of each peak from a known isotope. These library entries may be gathered employing a handheld (CZT radiation detector 102 to insure consistency between the library entries and observe values. Within the library 1126, a requirement-to-be-present value of a peak in the library 1126 may be defined as a "must have," "might have." or "unlikely." In one embodiment, if a given radioisotope from the library 1126 is to be considered a possible match to the pulse height data, there must be a matching peak (using fuzzy logic) in the pulse height data for each "must have" peak in the radioisotope from the library 1126.

As the library 1126 entries are searched, the energy-level of a peak from the library 1126 may be compared to the energy of a peak from the pulse height data using fuzzy logic. This approach is tolerant of calibration error and adds to the robust nature of the measurement, particularly when performed by untrained personnel.

The energy level of each peak from the library 1126 is subtracted from the energy level of a peak from the pulse height data, resulting in an energy-level value (ΔEN). In one embodiment, the energy level of the peak is defined as the energy level of the highest point of that peak, i.e., a local maximum inflection point. In one embodiment, the following weighting value equation may be employed to convert the energy level value (ΔEN) into an energy-level weighting value (~ΔEN) 1124.

$$\sim \Delta EN = \begin{cases} 0, 15 < \Delta EN < -15; \\ \mu(\Delta EN), -15 < \Delta EN < -4; \\ \mu(\Delta EN), 4 < \Delta EN < 15; \\ 1, 4 > \Delta EN > -4. \end{cases}$$

As discussed above, those skilled in the art understand that many variations of this weighting, value equation fall within the scope and spirit of this invention The fuzzy-logic component 1100 may have a matching component 1126, which produces a matching weighting value 1130 (~Match) and a listing of radioisotopes 1132 by analyzing the energy-level weighting value (~ΔEN) 1124 and the peak analysis weighting value (~Peak) 1108. To do so, in one embodiment, the matching component 1128 may implement the following equation:

~Match=~Peak~and~ΔEN.

Thus, the matching weighting value (~Match) 1130 for each peak in the library 1126 will be nonzero only if the corresponding peak analysis weighting value (~Peak) 1108 and energy-level weighting value (~Energy) 1124 are also nonzero. Stated another way, there is a match only if the peak from the pulse height data is significant and possesses an energy level close to the energy level of a corresponding library 1126 isotope (e.g., within 15 KeVs). In one implementation, a listing of radioisotopes is comprised of all library radioisotopes in which all "must have" peaks have a nonzero matching weighting value 1130.

The fuzzy-logic component 1100 may further comprise a ranking component 1134, which produces a ranked listing of radioisotopes 1136 by analyzing the matching weighting value 1130 and the peak analysis weighting value 1108. In one embodiment, a ranking weighting value (~Ranking) is assigned to each radioisotope from the listing of radioisotopes 1132 according to the following formula:

~Ranking-|Σ(~Peaks)$_{pulse\ height\ data}$-Σ(~Match)$_{radioisotopes\ from\ library}$.

The table shown in FIG. 15 illustrates one embodiment of this formula. In this table, five peaks 1502 were identified in a corresponding pulse height data. The energy level 1504 of each of the five peaks is specified. A sum 1506 of the peak analysis weighting values from the pulse height data is subtracted from a sum 1508 of the matching weighting values 1130 of each radioisotope from the listing of radioisotopes 1132. An absolute value of the resulting difference is taken, producing a ranking weighting value (~Ranking) 1510 for each radioisotope from the listing of radioisotopes 1132. The lower the ranking weighting value 1510, the more closely a radioisotope from the listing of radioisotopes 1132 matches the pulse height data for the unknown radioisotope. Thus, in the example shown in FIG. 15, the resulting ranked listing of radioisotopes 1136 is:

1. Ba-133
2. NP-237
3. Xe-133

In sum, the handheld CZT radiation detector 102 provides a portable radiation detector implementing a fuzzy-logic component 1100 adapted to in-field analysis. The fuzzy-logic component 1100 is computationally less intensive than identification algorithms used in conventional portable detectors, thus providing timely and more accurate results to an end-user and extending the detector's battery life.

Furthermore, the handheld CZT radiation detector 102 may implement a coplanar grid CZT gamma-ray sensor. The coplanar grid CZT gamma ray sensor provides higher resolution than conventional seintillators, but does not require in-field calibration or cooling to liquid-nitrogen temperatures like high-purity germanium detectors. To be more specific, the handheld CZT radiation detector 102 provides about twice the resolution of a conventional seintillator and may be operated by untrained individuals, unlike a high-purity germanium detector. In addition, as the name implies, the handheld CZT radiation detector is sized to be held in a person's hand, just as a personal data assistant. Thus, the handheld CZT radiation detector 102 is substantially smaller than conventional portable radiation detectors. In addition, the detector 102 is user-friendly because, in one embodiment, a user may interact with the detector 102 through a personal data assistant.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A handheld device for detecting and identifying radioisotopes, comprising:
   a cadmium zinc telluride (CZT), gamma-ray sensor configured to produce gamma-ray data;
   a processor;
   a memory coupled to the processor, the memory configured to store instructions executable by the processor;
   a multi-channel analyzer (MCA) coupled to the gamma-ray sensor and processor, the MCA configured to produce pulse height data corresponding to the gamma-ray data;
   a fuzzy-logic component that uses at least one weighting value, the fuzzy-logic component being coupled to the MCA and processor, the fuzzy-logic component configured to compile a ranked listing of radioisotopes corresponding to the produced pulse height data, the ranked listing indicating how closely pulse height data from a library of radioisotopes matches the produced pulse height data; and
   an interface coupled to the fuzzy-logic component, the interface configured to convey a signal containing the ranked listing of radioisotopes from the fuzzy-logic component to a display component;
   wherein a combination of the gamma-ray sensor, processor, memory, MCA, fuzzy-logic component, and interface are sized to be held in a person's hand.

2. The device of claim 1, further comprising a display component configured to receive the signal and display a visual indication of the ranked listing.

3. The device of claim 2, further comprising:
   a first housing configured to receive the gamma ray sensor, processor, memory, MCA, fuzzy-logic component, and interface; and
   a second housing configured to contain the display component.

4. The device of claim 3, wherein the first housing further comprises a recess configured to subtend the second housing.

5. The device of claim 4, wherein the first housing is sized to be held in a person's hand.

6. The device of claim 2, wherein the display component is a personal data assistant.

7. The device of claim 1, wherein the fuzzy-logic component further comprises:
   a peak search component configured to produce peak search data by analyzing the produced pulse height data;
   a peak analysis component configured to produce a peak analysis weighting value by analyzing the peak search data;
   an energy-level component configured to produce an energy-level weighting value by comparing an energy level of a peak from the produced pulse height data to an energy level of a peak from a library of known isotopes;
   a matching component configured to produce a matching weighting value and a listing of radioisotopes by analyzing the energy-level weighting value and the peak analysis weighting value; and
   a ranking component configured to produce the ranked listing of radioisotopes by analyzing the matching weighting value and the peak analysis weighting value.

8. The device of claim 1, wherein the gamma-ray sensor component comprises
   a Coplanar-grid CZT, gamma-ray sensor.

9. The device of claim 8, wherein the gamma-ray sensor is configured to operate at temperatures ranging from about $-10°$ to about $\pm 50°$ Celsius.

10. The device of claim 8, wherein the gamma-ray sensor has a resolution better than 3.5% full-width half-maximum (FWHM) at 662 KeV.

11. The device of claim 1, wherein the interface is a serial port.

12. The device of claim 1, wherein the interface is an infrared port.

13. The device of claim 1, further comprising:
   a digital pulse height correction component for correcting the produced pulse height data.

14. A handheld device for detecting and identifying radioisotopes, comprising:
   sensor means for sensing gamma rays employing cadmium zinc telluride (CZT), the sensor means configured to produce gamma-ray data;
   processor means for executing instructions;
   memory means for storing instructions executable by the processor, the memory means coupled to the processor;
   MCA means for performing multi-channel analysis (MCA), the MCA means coupled to the sensor means and processor means, the MCA means configured to produce pulse height and corresponding to the gamma-ray data;
   analysis means for compiling a ranked listing of radio-isotopes corresponding to the produced pulse height data, the analysis means coupled to the MCA means and processor means, the ranked listing indicating how closely pulse height data from a library of radioisotopes matches the produced pulse height data, the analysis means having a fuzzy logic component that uses at least one weighting value; and
   interface means for conveying a signal containing the ranked listing of radioisotopes from the analysis means to a display means, the interface means coupled to the analysis means, wherein a combination of the sensor means, processor means, memory means, MCA means, analysis means, and interface means are sized to be held in a person's hand.

15. A handheld device for detecting and identifying radioisotopes, comprising:

a cadmium zinc telluride (CZT), gamma-ray sensor configured to produce gamma-ray data;

a processor;

a memory coupled to the processor, the memory configured to store instructions executable by the processor;

a multi-channel analyzer (MCA) coupled to the gamma-ray sensor and processor, the MCA configured to produce pulse height data corresponding to the gamma-ray data;

a fuzzy-logic component that uses at least one weighting value, the fuzzy-logic component being coupled to the MCA and processor, the fuzzy-logic component configured to compile a ranked listing of radioisotopes corresponding to the produced pulse height data, the ranked listing indicating how closely pulse height data from a library of radioisotopes matches the produced pulse height data;

a neutron sensor configured to produce an indicator when neutrons are detected; and an interface coupled to the neutron sensor and the fuzzy-logic component, the interface configured to convey a signal containing the indicator and the ranked listing of radioisotopes from the fuzzy-logic component to a display component, wherein a combination of the gamma-ray sensor, processor, memory, MCA, fuzzy-logic component, neutron sensor, and interface are sized to be held in a person's hand.

16. The device of claim 15, further comprising a display component configured to receive the signal and display a visual indication of the indicator and the ranked listing.

17. The device of claim 16, further comprising:

a first housing configured to receive the gamma ray sensor, processor, memory, MCA, fuzzy-logic component, neutron sensor, and interface; and a second housing configured to contain the display component.

18. The device of claim 17, wherein the first housing further comprises a recess configured to subtend the second housing.

19. The device of claim 18, wherein the first housing is sized to be held in a person's hand.

20. The device of claim 16, wherein the display component is a persona data assistant.

21. The device of claim 15, wherein the fuzzy-logic component further comprises:

a peak search component configured to produce peak search data by analyzing the produced pulse height data;

a peak analysis component configured to produce a peak analysis weighting value by analyzing the peak search data;

an energy-level component configured to produce an energy-level weighting value by comparing an energy level of a peak from the produced pulse height data to an energy level of a peak from a library of known isotopes;

a matching component configured to produce a matching weighting value and a listing of radioisotopes by analyzing the energy-level weighting value and the peak analysis weighting value; and a ranking component configured to produce the ranked listing of radioisotopes by analyzing the matching weighting value and the peak analysis weighting value.

22. The device of claim 15, wherein the gamma-ray sensor component comprises a Coplanar-grid CZT, gamma-ray sensor.

23. The device of claim 22, wherein the gamma-ray sensor is configured to operate at temperatures ranging from about −10° to about +50° Celsius.

24. The device of claim 22, wherein the gamma-ray sensor has a resolution better than 3.5% full-width half-maximum (FWHM) at 662 KeV.

25. The device of claim 15, wherein the interface is a serial port.

26. The device of claim 15, wherein the interface is an infrared port.

27. The device of claim 15, wherein the neutron sensor is a helium-3 proportional counter.

28. The device of claim 15, further comprising:

a digital pulse height correction component for correcting the produced pulse height data.

29. A handheld device for detecting and identifying radioisotopes, comprising:

a cadmium zinc telluride (CZT), gamma-ray sensor configured to produce gamma-ray data;

a processor;

a memory coupled to the processor, the memory configured to store instructions executable by the processor;

a multi-channel analyzer (MCA) coupled to the gamma-ray sensor and processor, the MCA configured to produce pulse height data corresponding to the gamma-ray data;

a fuzzy-logic component that uses at least one weighting value, the fuzzy-logic component being coupled to the MCA and processor, the fuzzy-logic component configured to compile a ranked listing of radioisotopes corresponding to the produced pulse height data, the ranked listing indicating how closely pulse height data from a library of radioisotopes matches the produced pulse height data;

a neutron sensor configured to produced an indicator when neutrons are detected;

an interface coupled to the neutron sensor and the fuzzy-logic component, the interface configured to convey a signal containing the indicator and the ranked listing of radioisotopes from the fuzzy-logic component to a display component; and a display component configured to receive the signal and display a visual indication of the indicator and the ranked listing, wherein a combination of the gamma-ray sensor, processor, memory, MCA, fuzzy-logic component, neutron sensor, display component, and interface are sized to be held in person's hand.

30. The device of claim 29, further comprising:

a first housing configured to receive the gamma ray sensor, processor, memory, MCA, fuzzy-logic component, neutron sensor, and interface; and a second housing configured to contain the display component.

31. The device of claim 30, wherein the first housing further comprises a recess configured to subtend the second housing.

32. The device of claim 31, wherein the first housing is sized to be held in a person's hand.

33. The device of claim 29, wherein the display component is a personal data assistant.

34. The device of claim 33, wherein the personal data assistant is configured to transmit a message instructing the neutron sensor and the gamma ray sensor to begin detection, and wherein the interface is configured to receive the message and instruct the neutron sensor and gamma ray sensor to begin detection.

35. The device of claim 29, wherein the fuzzy-logic component further comprises:
   a peak search component configured to produce peak search data by analyzing the produced pulse height data;
   a peak analysis component configured to produce a peak analysis weighting value by analyzing the peak analysis data;
   an energy-level component configured to produce an energy-level weighting value by comparing an energy level of a peak from the produced pulse height data to an energy level of a peak from a library of known isotopes;
   a matching component configured to produce a matching weighting value and a listing of radioisotopes by analyzing the energy-level weighting value and the peak analysis weighting value; and
   a ranking component configured to produce the ranked listing of radioisotopes by analyzing the matching weighting value and the peak analysis weighting value.

36. The device of claim 29, wherein the gamma-ray sensor component comprises
   a Coplanar-grid CZT, gamma-ray sensor.

37. The device of claim 36, wherein the gamma-ray sensor is configured to operate at temperatures ranging from about −10° to about +50° Celsius.

38. The device of claim 36, wherein the gamma-ray sensor has a resolution better than 3.5% full-width half-maximum (FWHM) at 662 KeV.

39. The device of claim 29, wherein the interface is a serial port.

40. The device of claim 29, wherein the interface is an infrared port.

41. The device of claim 29, wherein the neutron sensor is a helium-3 proportional counter.

42. The device of claim 29, further comprising:
   a digital pulse height correction component for correcting the produced pulse height data.

43. A handheld device for detecting and identifying radioisotopes, comprising:
   a cadmium zinc telluride (CZT), gamma-ray configured to produce gamma-ray data;
   a processor;
   a memory coupled to the processor, the memory configured to store instructions executable by the processor;
   a multi-channel analyzer (MCA) coupled to the gamma-ray sensor and processor, the MCA configured to produce pulse height data corresponding to the gamma-ray data;
   a fuzzy-logic component coupled to the MCA and processor, the fuzzy-logic component configured to compile a ranked listing of radioisotopes corresponding to the pulse height data; and
   an interface coupled to the fuzzy-logic component, the interface configured to convey a signal containing the ranked listing of radioisotopes from the fuzzy-logic component to a display component, wherein a combination of the gamma-ray sensor, processor, memory, MCA, fuzzy-logic component, and interface are sized to be held in a person's hand; and wherein the fuzzy-logic component further comprises:
   a peak search component configured to produce peak search data by analyzing the pulse height data;
   a peak analysis component configured to produce a peak analysis weighting value by analyzing the peak search data;
   an energy-level component configured to produce an energy-level weighting value by comparing an energy level of a peak from the pulse height data to an energy level of a peak from a library of known isotopes;
   a matching component configured to produce a matching weighting value and a listing of radioisotopes by analyzing the energy-level weighting value and the peak analysis weighting value, and
   a ranking component configured to produce the ranked listing of radioisotopes by analyzing the matching weighting value and the peak analysis weighting value; and wherein the peak analysis component comprises:
   a peak significance component configured to produce a peak significance weighting value;
   a peak symmetry component configured to produce a peak symmetry weighting value; and
a peak parity component configured to produce a peak parity weighting value.

44. A handheld device for detecing and identifying radioisotopes, comprising:
   a cadmium zinc telluride (CZT), gamma-ray sensor configured to produce gamma-ray data;
   a processor;
   a memory coupled to the processor, the memory configured to store instructions executable by the processor;
   a multi-channel analyzer (MCA) coupled to the gamma-ray sensor and processor, the MCA configured to produce pulse height data corresponding to the gamma-ray data;
   a fuzzy-logic component coupled to the MCA and processor, the fuzzy-logic component configured to compile a ranked listing of radioisotopes corresponding to the pulse height data;
   a neutron sensor configured to produce an indicator when neutrons are detected; and
   an interface coupled to the neutron sensor and the fuzzy-logic component, the interface configured to convey a signal containing the indicator and the ranked listing of radioisotopes from the fuzzy-logic component to a display component, wherein a combination of the gamma-ray sensor, processor, memory, MCA, fuzzy-logic component, neutron sensor, and interface are sized to be held in a person's hand; and wherein the fuzzy-logic component further comprises:
   a peak search component configured to produce peak search data by analyzing the pulse height data;
   a peak analysis component configured to produce a peak analysis weighting value by analyzing the peak search data;
   an energy-level component configured to produce an energy-level weighting value by comparing an energy level of a peak from the pulse height data to an energy level of a peak from a library of known in isotopes;

a matching component configured to produce a matching weighting value and a listing of radioisotopes by analyzing the energy-level weighting value and the peak analysis weighting value; and a ranking component configured to produce the ranked listing of radioisotopes by analyzing the matching weighting value and the peak analysis weighting value; and wherein the peak analysis component comprises:
    a peak significance component configured to produce a peak significance weighting value;
    a peak symmetry component configured to produce a peak symmetry weighting value; and
    a peak parity component configured to produce a peak parity weighting value.

45. A handheld device for detecing and identifying radioisotopes, comprising:

a cadmium zinc telluride (CZT), gamma-ray sensor configured to produce gamma-ray data;

a processor;

a memory coupled to the processor, the memory configured to store instructions executable by the processor;

a multi-channel analyzer (MCA) coupled to the gamma-ray sensor and processor, the MCA configured to produce pulse height data corresponding to the gamma-ray data;

a fuzzy-logic component coupled to the MCA and processor, the fuzzy-logic component configured to compile a ranked listing of radioisotopes corresponding to the pulse height data;

a neutron sensor configured to produce an indicator when neutrons are detected, an interface coupled to the neutron sensor and the fuzzy-logic component, the interface configured to convey a signal containing the indicator and the ranked listing of radioisotopes from the fuzzy-logic component to a display component, and a display component configured to receive the signal and display a visual indication of the indicator and the ranked listing, wherein a combination of the gamma-ray sensor, processor, memory, MCA, fuzzy-logic component, neutron sensor, display component, and interface are sized to be held in a person's hand; and wherein the fuzzy-logic component further comprises:
    a peak search component configured to produce peak search data by analyzing the pulse height data;
    a peak analysis component configured to produce a peak analysis weighting value by analyzing the peak analysis data;
    an energy-level component configured to produce an energy-level weighting value by comparing an energy level of a peak from the pulse height data to an energy level of a peak from a library of known in isotopes,
    a matching component configured to produce a matching weighting value and a listing of radioisotopes by analyzing the energy-level weighting value and the peak analysis weighting value; and
    a ranking component configured to produce the ranked listing of radioisotopes by analyzing the matching weighting value and the peak analysis weighting value; and wherein the peak analysis component comprises:
    a peak significance component configured to produce a peak significance weighting value;
    a peak symmetry component configured to produce a peak symmetry weighting value; and
    a peak parity component configured to produce a peak parity weighting value.

* * * * *